(12) United States Patent
Son et al.

(10) Patent No.: US 9,601,132 B2
(45) Date of Patent: Mar. 21, 2017

(54) METHOD AND APPARATUS FOR MANAGING AUDIO SIGNALS

(71) Applicant: Samsung Electronics Co., Ltd., Gyeonggi-do (KR)

(72) Inventors: Beakkwon Son, Gyeonggi-do (KR); Gangyoul Kim, Gyeonggi-do (KR); Namil Lee, Gyeonggi-do (KR); Hochul Hwang, Seoul (KR); Jongmo Kum, Seoul (KR); Minho Bae, Seoul (KR)

(73) Assignee: Samsung Electronics Co., Ltd., Yeongtong-gu, Suwon-si, Gyeonggi-do (KR)

(*) Notice: Subject to any disclaimer, the term of this patent is extended or adjusted under 35 U.S.C. 154(b) by 0 days.

(21) Appl. No.: 15/045,591

(22) Filed: Feb. 17, 2016

(65) Prior Publication Data

US 2016/0163329 A1     Jun. 9, 2016

Related U.S. Application Data

(63) Continuation of application No. 14/840,336, filed on Aug. 31, 2015.

(30) Foreign Application Priority Data

Sep. 1, 2014    (KR) .................. 10-2014-0115394

(51) Int. Cl.
*H04R 3/00* (2006.01)
*G10L 21/028* (2013.01)
(Continued)

(52) U.S. Cl.
CPC .......... *G10L 21/028* (2013.01); *G01S 3/8083* (2013.01); *G10L 15/265* (2013.01); *G10L 17/00* (2013.01); *G10L 21/10* (2013.01); *G10L 25/51* (2013.01); *H04R 1/326* (2013.01); *H04R 3/005* (2013.01); *H04R 25/405* (2013.01); *H04R 29/005* (2013.01); *G10L 25/21* (2013.01); *H04R 1/40* (2013.01); *H04R 2203/12* (2013.01); *H04R 2430/21* (2013.01)

(58) Field of Classification Search
CPC  H04R 3/005; H04R 2420/07; H04R 2499/11; H04R 2201/40; H04R 2410/01; H04R 2499/15; H04R 2225/41; H04R 2430/20; H04R 2430/23; G06F 3/167; G11B 19/025; G11B 2020/00014; G11B 2020/10546; G11B 20/10527; H04S 1/007
USPC .. 381/92, 17, 18, 309, 56, 61, 94.2; 700/94; 455/412.1, 415, 567; 704/214, 246
See application file for complete search history.

(56) References Cited

U.S. PATENT DOCUMENTS 7,672,196 B1    3/2010  Hanyu
2005/0182627 A1*  8/2005  Tanaka ............. G11B 20/00007
                                                  704/248

(Continued)

FOREIGN PATENT DOCUMENTS

EP       2 026 329 A1    2/2009

*Primary Examiner* — Paul S Kim
*Assistant Examiner* — Norman Yu
(74) *Attorney, Agent, or Firm* — Cha & Reiter, LLC

(57) ABSTRACT

A method comprising: detect a first acoustic signal by using a microphone array; detecting a first angle associated with a first incident direction of the first acoustic signal; and storing, in a memory, a representation of the first acoustic signal and a representation of the first angle.

14 Claims, 21 Drawing Sheets

(51) Int. Cl.
   *G01S 3/808*    (2006.01)
   *G10L 17/00*    (2013.01)
   *G10L 25/51*    (2013.01)
   *H04R 1/32*     (2006.01)
   *H04R 25/00*    (2006.01)
   *G10L 15/26*    (2006.01)
   *G10L 21/10*    (2013.01)
   *H04R 29/00*    (2006.01)
   *H04R 1/40*     (2006.01)
   *G10L 25/21*    (2013.01)

(56) References Cited

U.S. PATENT DOCUMENTS

| | | | |
|---|---|---|---|
| 2006/0246874 A1* | 11/2006 | Sullivan | H04M 1/274583 455/412.1 |
| 2006/0262943 A1 | 11/2006 | Oxford | |
| 2009/0089055 A1 | 4/2009 | Caspi et al. | |
| 2009/0198495 A1* | 8/2009 | Hata | G10L 15/04 704/246 |
| 2010/0278354 A1 | 11/2010 | Wu et al. | |
| 2011/0013075 A1 | 1/2011 | Kim et al. | |
| 2012/0065973 A1 | 3/2012 | Cho et al. | |
| 2015/0245133 A1* | 8/2015 | Kim | H04R 1/326 381/92 |

* cited by examiner

FIG. 21

| Speaker | Text (STT) | Time | Play |
|---|---|---|---|
| | The issue of today's meeting... | 00:00:00 ~ 00:00:34 | ▶ |
| | My opinion is... | 00:00:34 ~ 00:02:10 | ▶ |
| | I oppose the opinion.... Because... | 00:02:10 ~ 00:03:14 | ▶ |
| | But, if you think like this... | 00:03:14 ~ 00:05:20 | ▶ |
| | ...... | ...... | ...... |
| | ...... | ...... | ...... |
| | ...... | ...... | ...... |

METHOD AND APPARATUS FOR MANAGING AUDIO SIGNALS

CROSS REFERENCE TO RELATED APPLICATIONS

This is a Continuation application of U.S. patent application Ser. No. 14/840,336 filed on Aug. 31, 2015 which claims priority from and the benefit under 35 U.S.C. §119(a) of Korean Patent Application No. 10-2014-0115394, filed on Sep. 1, 2014, which is hereby incorporated by reference for all purposes as if fully set forth herein.

BACKGROUND

1. Field of the Disclosure

The present disclosure relates to electronic devices, and more particularly to a method and apparatus for managing audio signals.

2. Description of the Prior Art

Recently, the electronic device has provided a function to record another party's voice at the usual time or during a phone call, as well as basic functions, such as telephony or sending messages, to a user.

The electronic device includes a microphone for voice recording. The electronic device includes a plurality of microphones in order to thoroughly record audio signals. The plurality of microphones recognizes the direction of a speaker, and implements beams in the direction to thereby thoroughly record a voice that comes from the direction of the speaker. The beams may be implemented by applying a weight value to the microphones in order to increase the amplitude of the audio signal.

SUMMARY

According to one aspect of the disclosure, a method is provided comprising: detecting a first acoustic signal by using a microphone array; detecting a first angle associated with a first incident direction of the first acoustic signal; and storing, in a memory, a representation of the first acoustic signal and a representation of the first angle.

According to another aspect of the disclosure, an electronic device is provided comprising: a microphone array; a memory; a speaker; and at least one processor configured to: detect a first acoustic signal by using a microphone array; detect a first angle associated with a first incident direction of the first acoustic signal; and store, in a memory, a representation of the first acoustic signal and a representation of the first angle.

BRIEF DESCRIPTION OF THE DRAWINGS

The above features and advantages of the present disclosure will be more apparent from the following detailed description in conjunction with the accompanying drawings, in which:

FIG. 21 is a diagram of an example of a user interface for rendering audio, according to various embodiments of the present disclosure.

DETAILED DESCRIPTION

Figure 1:
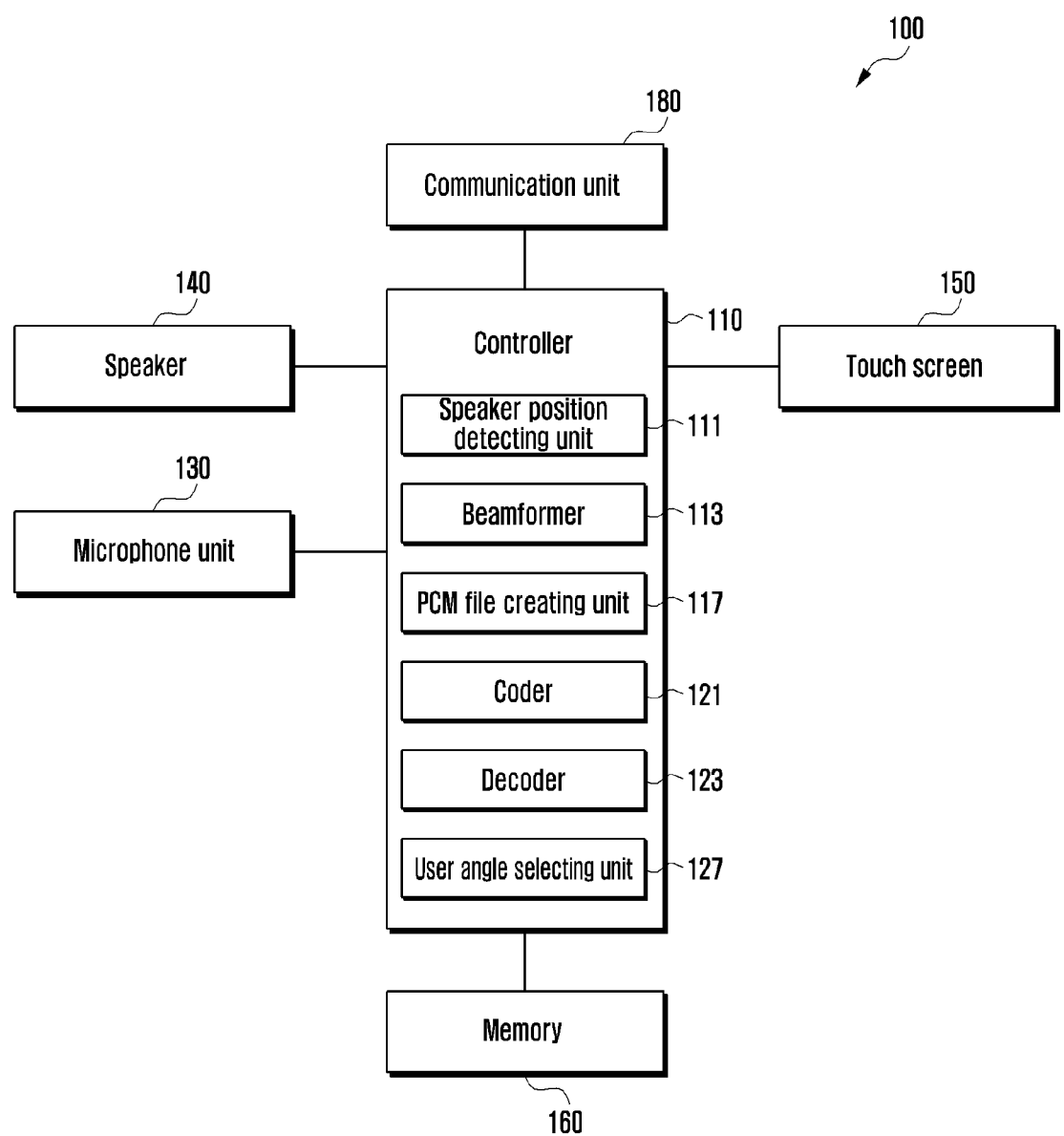
FIG. 1 is a block diagram of an example of an electronic device, according to various embodiments of the present disclosure.

Hereinafter, embodiments of the present disclosure will be described in detail with reference to the accompanying drawings. It will be easily appreciated by those skilled in the art that various modifications, additions and substitutions are possible in the embodiments disclosed herein, and that the scope of the disclosure should not be limited to the following embodiments. The embodiments of the present disclosure are provided such that those skilled in the art completely understand the disclosure. In the drawings, the same or similar elements are denoted by the same reference numerals even though they are depicted in different drawings.

The expressions such as "include" and "may include" which may be used in the present disclosure denote the presence of the disclosed functions, operations, and constituent elements and do not limit one or more additional functions, operations, and constituent elements. In the present disclosure, the terms such as "include" and/or "have"

may be construed to denote a certain characteristic, number, step, operation, constituent element, component or a combination thereof, but may not be construed to exclude the existence of or a possibility of the addition of one or more other characteristics, numbers, steps, operations, constituent elements, components or combinations thereof.

In the present disclosure, the expression "and/or" includes any and all combinations of the associated listed words. For example, the expression "A and/or B" may include A, may include B, or may include both A and B.

In the present disclosure, expressions including ordinal numbers, such as "first" and "second," etc., and/or the like, may modify various elements. However, such elements are not limited by the above expressions. For example, the above expressions do not limit the sequence and/or importance of the elements. The above expressions are used merely for the purpose of distinguishing an element from the other elements. For example, a first user device and a second user device indicate different user devices although for both of them the first user device and the second user device are user devices. For example, a first element could be termed a second element, and similarly, a second element could be also termed a first element without departing from the scope of the present disclosure.

When a component is referred to as being "connected to" or "accessed by" another component, it should be understood that not only the component is directly connected or accessed to the other component, but also another component may exist between the component and the other component. Meanwhile, when a component is referred to as being "directly connected" or "directly accessed" to other component, it should be understood that there is no component therebetween.

The terms used in the present disclosure are only used to describe specific various embodiments, and are not intended to limit the present disclosure. Singular forms are intended to include plural forms unless the context clearly indicates otherwise.

Unless otherwise defined, all terms including technical and/or scientific terms used herein have the same meaning as commonly understood by one of ordinary skill in the art to which the disclosure pertains. In addition, unless otherwise defined, all terms defined in generally used dictionaries may not be overly interpreted.

For example, the electronic device corresponds to a combination of at least one of the followings: a smartphone, a tablet Personal Computer (PC), a mobile phone, a video phone, an e-book reader, a desktop PC, a laptop PC, a netbook computer, a Personal Digital Assistant (PDA), a Portable Multimedia Player (PMP), a digital audio player (e.g., MP3 player), a mobile medic device, a camera, or a wearable device. Examples of the wearable device are a head-mounted-device (HMD) (e.g., electronic eyeglasses), electronic clothing, an electronic bracelet, an electronic necklace, an appcessory, an electronic tattoo, a smart watch, etc.

The electronic device according to the embodiments of the present disclosure may be smart home appliances. Examples of the smart home appliances are a television (TV), a Digital Video Disk (DVD) player, an audio system, a refrigerator, an air-conditioner, a cleaning device, an oven, a microwave oven, a washing machine, an air cleaner, a set-top box, a TV box (e.g., Samsung HomeSync™, Apple TV™, or Google TV™, a game console, an electronic dictionary, an electronic key, a camcorder, an electronic album, or the like.

The electronic device according to the embodiments of the present disclosure may include at least one of the following: medical devices (e.g., Magnetic Resonance Angiography (MRA), Magnetic Resonance Imaging (MRI), Computed Tomography (CT), a scanning machine, an ultrasonic scanning device, etc.), a navigation device, a Global Positioning System (GPS) receiver, an Event Data Recorder (EDR), a Flight Data Recorder (FDR), a vehicle infotainment device, an electronic equipment for ships (e.g., navigation equipment, gyrocompass, etc.), avionics, a security device, a head unit for vehicles, an industrial or home robot, an automatic teller's machine (ATM), a point of sales (POS) system, etc.

The electronic device according to the embodiments of the present disclosure may include at least one of the following: furniture or a portion of a building/structure, an electronic board, an electronic signature receiving device, a projector, various measuring instruments (e.g., a water meter, an electric meter, a gas meter and a wave meter), etc. respectively. The electronic device according to the embodiments of the present disclosure may also include a combination of the devices listed above. In addition, the electronic device according to the embodiments of the present disclosure may be a flexible device. It is obvious to those skilled in the art that the electronic device according to the embodiments of the present disclosure is not limited to the aforementioned devices.

Hereinafter, electronic devices according the embodiments of the present disclosure are described in detail with reference to the accompanying drawings. In the description, the term a 'user' may be referred to as a person or a device that uses an electronic device, e.g., an artificial intelligent electronic device.

FIG. 1 is a block diagram of an example of an electronic device, according to various embodiments of the present disclosure. Referring to FIG. 1, the electronic device 100 may include a controller 110, a microphone unit 130, a speaker 140, a memory 160, and a communication unit 180. The controller 110 may control overall operations of the electronic device 100 and the signal traffic between internal elements of the electronic device 100, and may perform a data processing function. For example, the controller 110 may be formed of a central processing unit (CPU), or an application processor (AP). In addition, the controller 110 may be formed of a single-core processor, or a multi-core processor.

The controller 110 may include at least one processor. Each of the processors may include any combination of: one or more general-purpose processors (e.g., ARM-based processors, multi-core processors, etc.), a Field-Programmable Gate Array (FPGA), an Application-Specific Integrated Circuit (ASIC), a Digital Signal Processor (DSP), a Programmable Logic Device (PLD), and/or any other suitable type of processing circuitry. Additionally or alternatively, the controller 110, may include a speaker position detecting unit 111, a beamformer 113, a pulse-code-modulation (PCM) file creating unit 117, a coder 121, a decoder 123, and a user angle selecting unit 127.

The speaker position detecting unit 111 may find the direction of an audio signal that has the highest level of energy from among audio signals received from a plurality of microphones 130. Here, the direction may be angle information. The speaker position detecting unit 111 may recognize the direction to which the speaker currently speaks, using energy information, phase information, or correlation information between the microphones. When a plurality of speakers simultaneously speak, the speaker position detecting unit 111 may recognize the angle information in order of the intensity of energy of the audio signals created by the speakers.

The beamformer 113 may give weight values to the microphones to increase the amplitude of the audio signal so that beams, which are able to spatially reduce the related noise when the direction of the audio signal and the direction of the noise are different from each other.

With regard to the formation of the beams, a sound wave created in the sound source travels a different distance to each microphone. Since the sound wave has a limited speed, the sound wave will reach each microphone at a different time instant. However, apart from the time difference, the sound waves created from the same sound source may be recognized as the same wave at each microphone. Therefore, if the position of the sound source is given, the arriving time difference of the sound wave may be calculated for the correction thereof to thereby make the waves match each other.

The PCM file creating unit 117 may convert the audio signals input from a plurality of microphones 130 into PCM files. Here, the PCM file refers to the file that is stored as a digital signal converted from an analog signal, i.e., the analog signal. If the analog signal is stored without the conversion, it may be affected by the noise, so the analog signal is to be converted into the digital signal to then be stored. The created PCM file may be transmitted to a D/A converter. The D/A converter may convert the digital signal into the analog signal. The PCM file may be converted into the analog file through the D/A converter, and the converted audio signal may be finally transmitted to the speaker 140 to be thereby output to the user.

The coder 121 may store the recorded audio signal as a compressed file using a codec in order to reduce the storage capacity of the audio signal that has been converted into the digital signal. The coder 121 may receive the angle information corresponding to the speaker from the speaker position detecting unit 111, and may store the same together with the recorded audio signal corresponding thereto.

The decoder 123 may decompress the file compressed through the coder 121. The user angle selecting unit 127 may recognize the angle selection of the user. The user angle selecting unit 127 may recognize the speaker selection of the user as well as the angle selection. If the user wishes to hear the audio signal of the speaker "B," or the audio signal of 90° that is mapped with the speaker "B," the user angle selecting unit 127 may select the speaker "B," or 90°. The user may select the same in a list or through a specific user interface (UI).

The microphone unit 130 may include a plurality of microphones. One or more microphones may receive the audio signals. The received audio signal may be recorded by the controller 110, and may be used in calculating the position of the speaker.

The speaker 140 may reproduce the audio signal received through at least one microphone. The audio signal may be reproduced by the instruction of the controller 110 according to the user's selection.

A touch screen 150 may receive the angle information from the user angle selecting unit 127 of the controller 110, and may display the same. Here, the angle information is stored as a file in the memory 160 together with the audio signal corresponding thereto. The touch screen 150 may detect the user's selection for one or more of the displayed angles, and may transfer the selected angle to the user angle selecting unit 127.

In addition, the touch screen 150 may receive a recorded audio signal list from the controller 110. The touch screen 150 may display the received recorded audio signal list. The touch screen 150 may receive text which is generated based on the audio signal associated with a specific speaker. The text may be generated by using a text-to-speech (TTS) by the controller 110. The recorded audio signal list may permit the user to the content of each audio signal.

The memory 160 may include at least one of an internal memory or an external memory. The internal memory, for example, may include at least one of a volatile memory {e.g., a DRAM (dynamic random access memory), an SRAM (static random access memory), an SDRAM (synchronous dynamic random access memory, or the like}, a non-volatile memory {e.g., an OTPROM (one time programmable read-only memory), a PROM (programmable read-only memory), an EPROM (erasable and programmable read-only memory), an EEPROM (electrically erasable and programmable read-only memory), a mask read-only memory, a flash read-only memory, or the like}, an HDD (hard disk drive), or a solid-state drive (SSD). The external memory may include at least one of a CF (compact flash), SD (secure digital), Micro-SD (micro secure digital), Mini-SD (mini secure digital), xD (extreme digital), a memory stick, a network-accessible storage (NAS), a cloud storage or the like. The memory 160 may store the audio file compressed by the coder 121.

The communication unit 180 may connect the electronic device 100 with external electronic devices. For example, the communication unit 180 may be connected to a network through wireless or wired communication to thereby communicate with the external electronic devices. The wireless communication may include Wi-Fi, BT (Bluetooth), NFC (near field communication), or the like. In addition, the wireless communication may include at least one selected from among the cellular communication networks (e.g., LTE, LTE-A, CDMA, WCDMA, UMTS, WiBro, GSM, or the like). For example, the wired communication may include at least one of a USB (universal serial bus), an HDMI (high definition multimedia interface), RS-232 (recommended standard 232), or a POTS (plain old telephone service).

Figure 2:
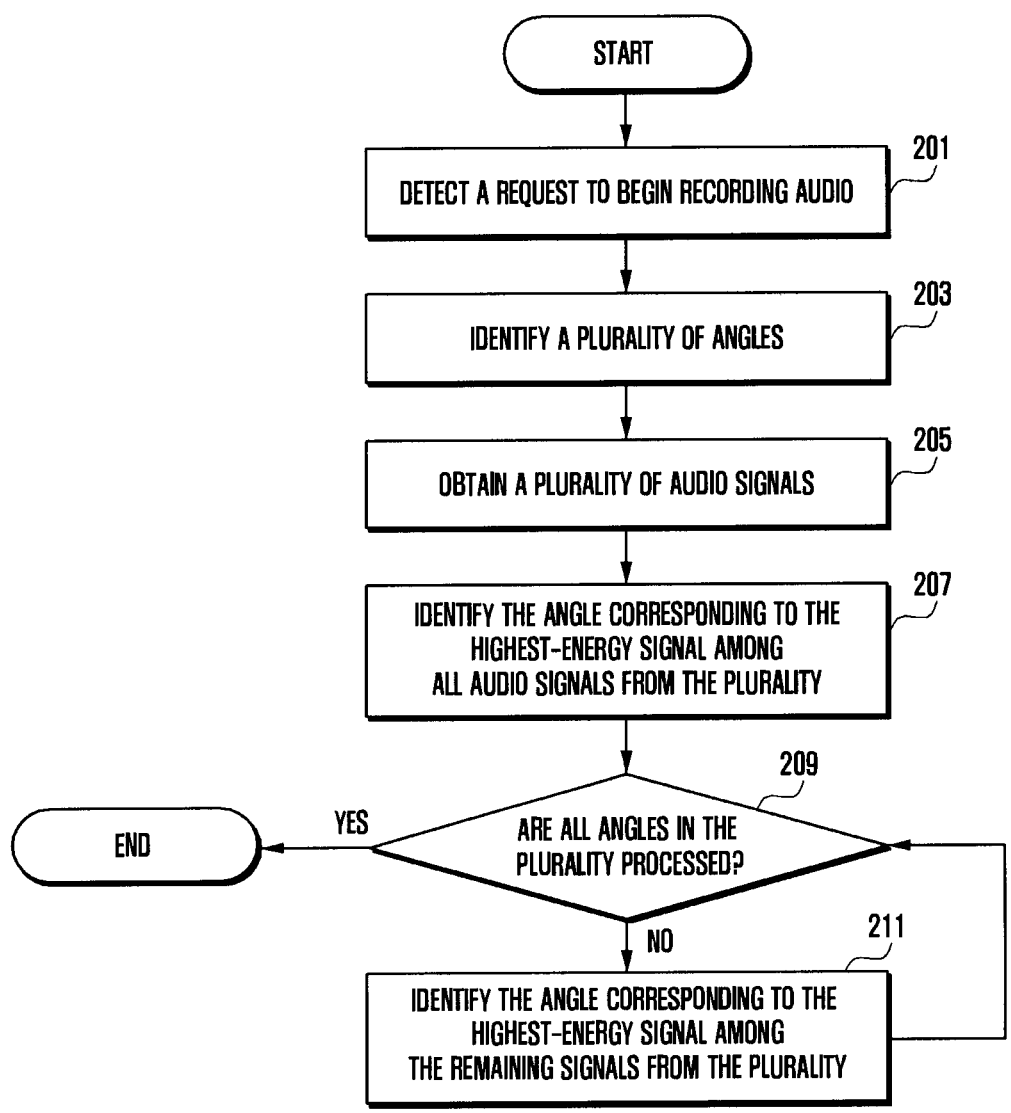
FIG. 2 is a flowchart of an example of a process, according to embodiments of the present disclosure.

FIG. 2 is a flowchart of an example of a process, according to embodiments of the present disclosure. Referring to FIG. 2, the controller 110 may recognize a user's request to begin the audio recording. In operation 203, the controller 110 may identify a plurality of angles. For example, the plurality of angles may be the angles of audio signals to be received. In some implementations, the controller 110 may map each of the received audio signals to a different one of a plurality of angles at an interval of 90 degrees, i.e., at the angles of 0°, 90°, 180°, and 270°, to thereby store the same. For example, the controller 110 may receive the audio signals from four microphones to detect the position of the speaker using energy information, phase information, or correlation information between the microphones. In instances in which the controller 110 recognizes that the position of the speaker is 80°, the controller 110 may configure the position of the speaker as 90°, which is the relatively approximate value compared with other angles.

In operation 205, the controller 110 may receive a plurality of audio signals through a plurality of microphones of the microphone unit 130.

In operation 207, the controller 110 may extract the audio signal that has the highest level of energy from the plurality of audio signals received from the plurality of microphones to thereby detect the angle of the audio signal. In operation 207, the controller 110 may map the detected angle to one of the plurality of angles identified in operation 203. For example, if the controller 110 determines that the audio signal having the highest level of energy is received at an angle of 160°, the controller 110 may map the audio signal with 180°, which is the approximate value compared to other angles.

In operation 209, the controller 110 may determine whether angles in the plurality identified in operation 203 have not been processed yet. For example, since the controller 110 configures that four audio signals are to be received at an interval of 90° in operation 203, the controller 110, which has received one audio signal in operation 207, may determine that there are three audio signals that have not yet been detected. If it is determined that there are angles that have not yet been processed, the controller 110 may proceed to operation 211. In operation 211, the controller 110 may detect the angle of the audio signal that has the highest level of energy from among the remaining audio signals rather than the detected audio signal. For example, if the angle of the detected audio signal is 90°, the audio signal may be mapped with 90°.

The controller 110 may return to operation 209 after detecting the angle of the audio signal that has the highest energy level from among the remaining audio signals in operation 211.

The controller 110 may repeat the operation above, and if all of the configured angles are detected, that is, if it is determined that no angle that is not detected exists, the controller 110 may terminate the operation.

Figure 3:
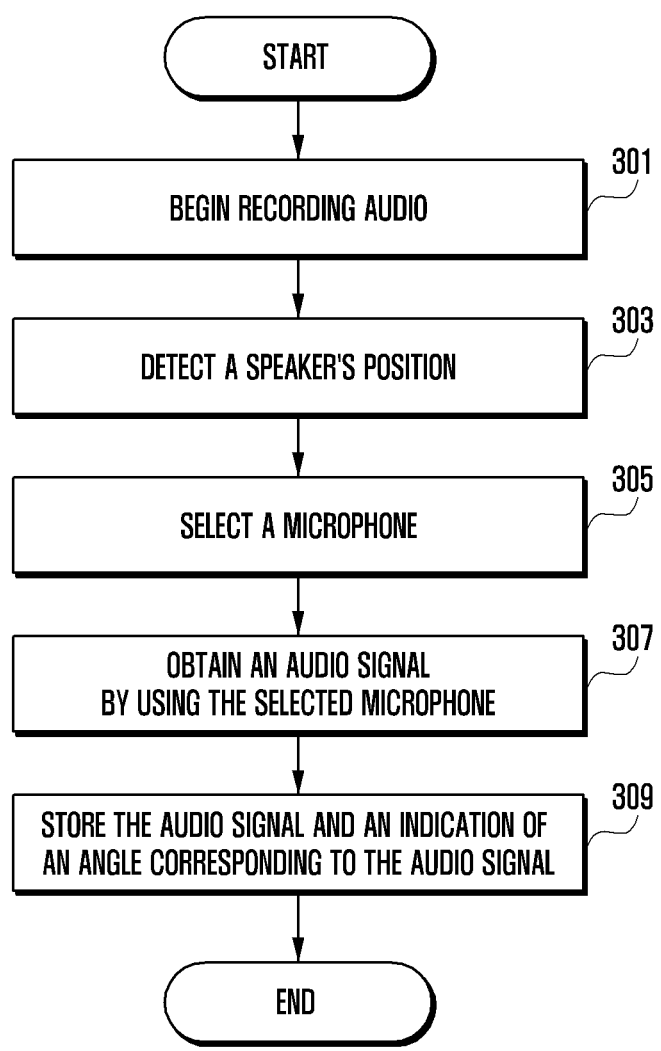
FIG. 3 is a flowchart of an example of a process, according to various embodiments of the present disclosure.
Figure 4:
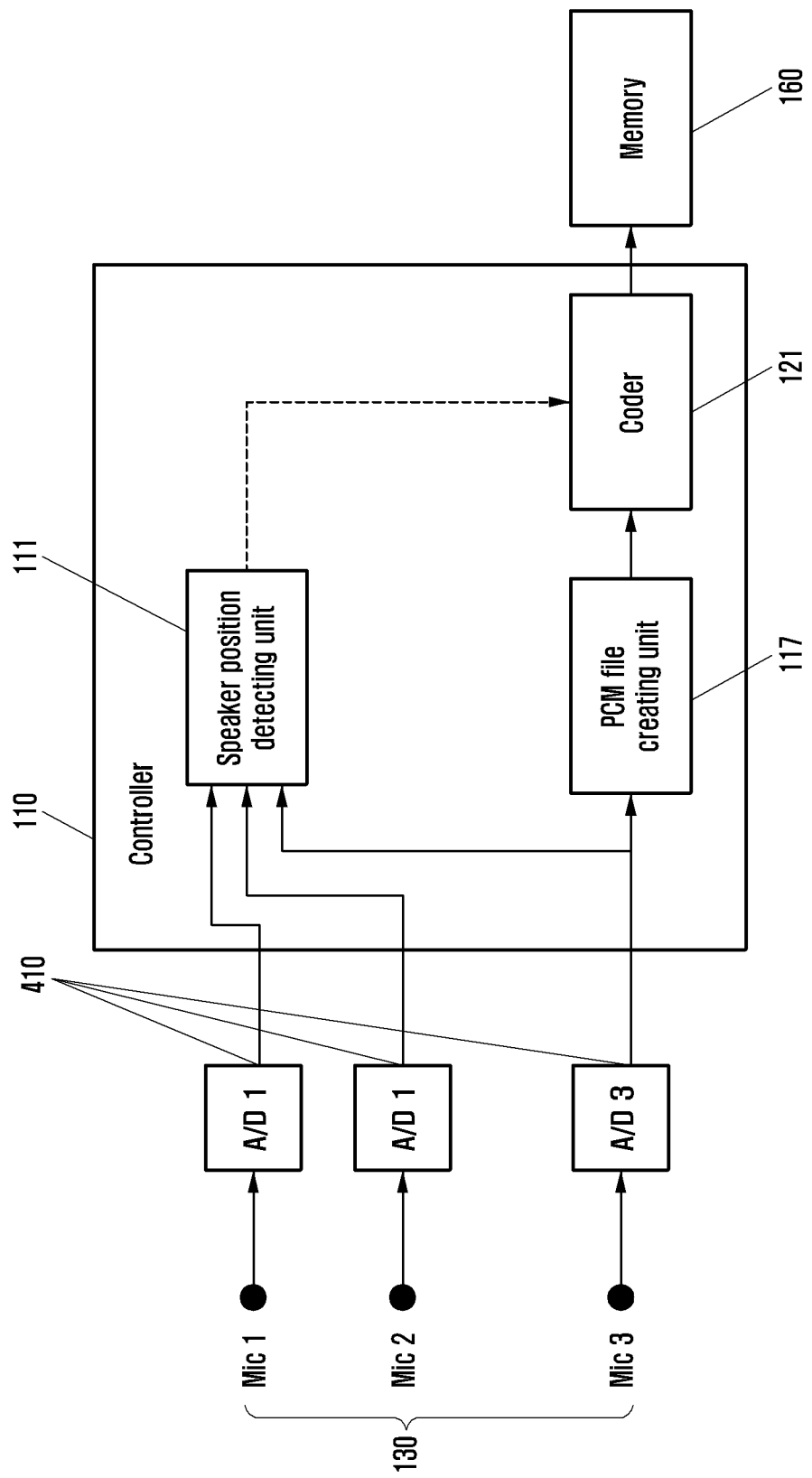
FIG. 4 is a diagram of an example of a system implementing the process of FIG. 3, according to various embodiments of the present disclosure.

FIG. 3 is a flowchart of an example of a process, according to various embodiments of the present disclosure. FIG. 4 is a diagram of an example of a system implementing the process of FIG. 3, according to various embodiments of the present disclosure.

The operation of FIG. 3 will be described in association with the signal flow of FIG. 4. In operation 301, the controller 110 may begin recording audio. For example, the controller 110 may recognize a user's request to begin the audio recording. Three microphones of the microphone unit 130 shown in FIG. 4 are used. Three A/D converters 410 may convert the audio signals received from the plurality of microphones into the digital files. The three A/D converters 410 may transfer the audio signals, which have been converted into the digital files, to the controller 110.

In operation 303, the controller 110 may detect the position of the speaker. That is, the controller 110 may recognize the angle corresponding to the audio signal, when the audio signal is received. In operation 305, the controller 110 may select one of the three microphones. Here, the microphones may be omnidirectional microphones. In operation 307, the controller 110 may record the audio signal using the selected microphone. In operation 309, the PCM file creating unit 117 and the speaker position detecting unit may receive the audio signal, which has been converted into the digital signals, from the A/D converter 410. The coder 121 of the controller 110 may encode the angle information, which is received from the speaker position detecting unit 111, the PCM file containing the audio signal. In addition, the coder 121 of the controller 110 may also encode time information into the PCM file. The time information may include a period of time for recording the audio signal, or the start time and the end time of the recording. The coder 121 of the controller 110 may transfer the compressed audio file to the memory 160 to store the same therein.

Figure 5:
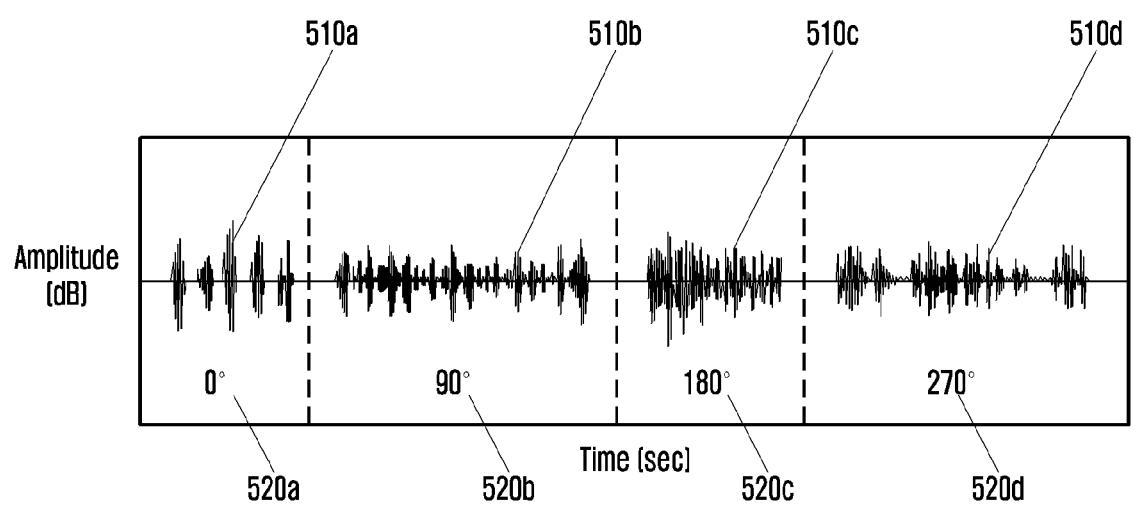
FIG. 5 is a diagram of an example of a stored audio signal, according to various embodiments of the present disclosure.

FIG. 5 is a diagram of an example of a stored audio signal, according to various embodiments of the present disclosure.

FIG. 5 shows the file recorded as a result of executing the process of FIG. 3, and the horizontal axis in FIG. 5 denotes time in which the unit may be a second. In addition, the vertical axis thereof denotes the magnitude of the audio signal in which the unit may be a decibel (dB). FIG. 5 shows an example in which the audio signals corresponding to several angles are stored as a single file. It shows that the audio signals, and the angles, at which the audio signals are received, are stored together. In addition, it shows that the recording time of each audio signal is stored as well. The recording time may be expressed as the length of the section for the audio signal of each speaker in the file.

Referring to the recorded file, the audio signal A (510a) occurs at an angle of 0° (520a). The audio signal B (510b) occurs at an angle of 90° (520b). The audio signal C (510c) occurs at an angle of 180° (520c). The audio signal D (510d) occurs at an angle of 270° (520d). Comparing the section of the audio signal A with the section of the audio signal B, the section of the audio signal A (510a) is shorter than the section of the audio signal B (510b). This means that the recording time for the audio signal A (510a) is shorter than the recording time of the audio signal B (510b).

Figure 6:
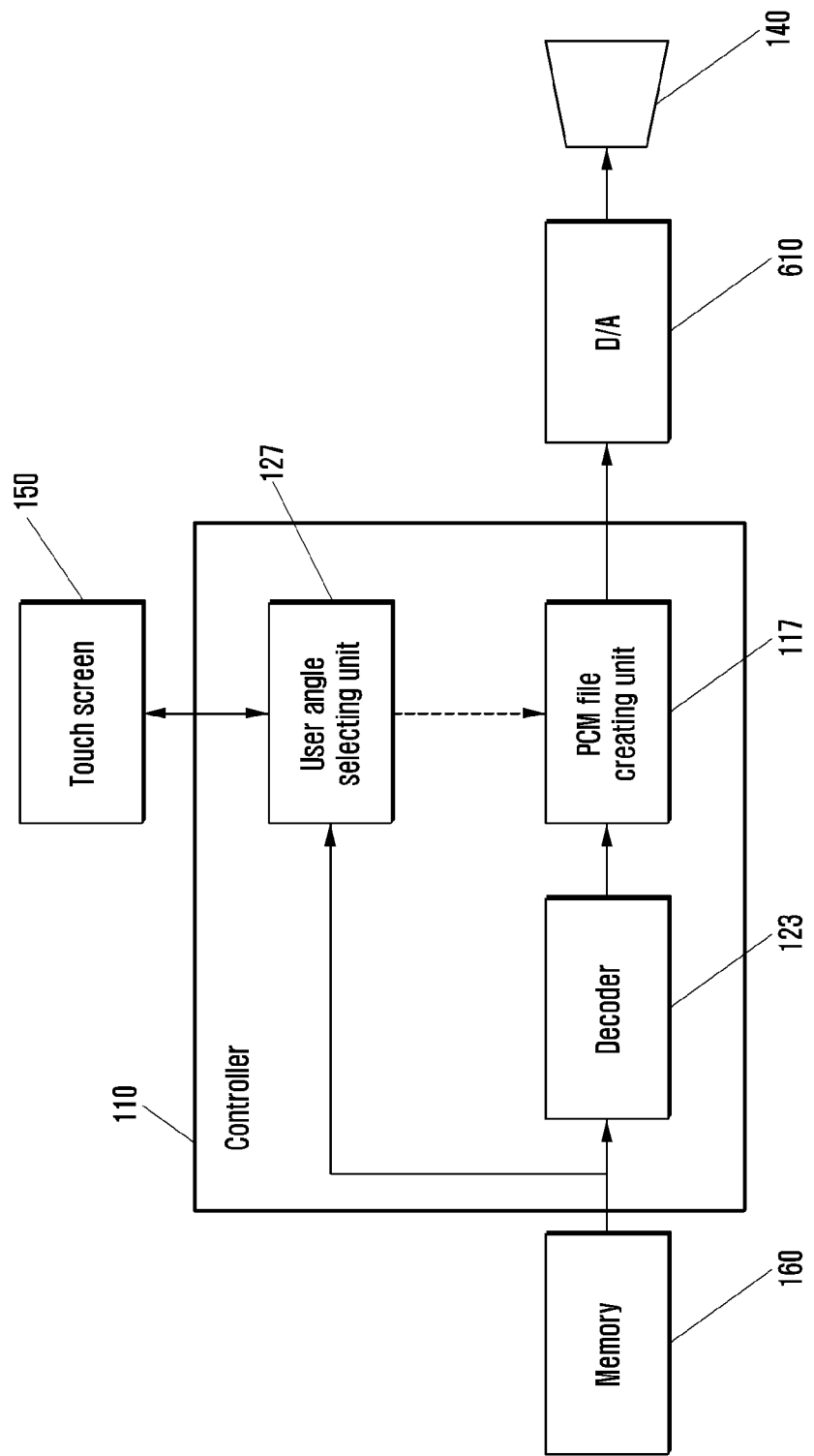
FIG. 6 is a diagram of an example of a system for rendering audio, according to various embodiments of the present disclosure.

FIG. 6 is a diagram of an example of a system for rendering audio, according to various embodiments of the present disclosure.

Referring to FIG. 6, the controller 110 may receive the compressed and stored audio file from the memory 160. The controller 110 may transfer the compressed audio file to the decoder 123. In addition, the controller 110 may transfer the angle information corresponding to the compressed audio file to the user angle selecting unit 127. The user angle selecting unit 127 may transfer the angle information to the touch screen 150. The touch screen 150 may display all angles identified by the angle information to allow the user to select at least one thereof. The touch screen 150 may transfer the angle selected by the user to the user angle selecting unit 127. The user angle selecting unit 127 may transfer the angle selected by the user to the PCM file creating unit 117. The PCM file creating unit 117 may transform only the audio signal corresponding to the selected angle into a PCM file, and may transfer the same to the D/A converter.

The D/A converter 610 may convert the PCM file into an analog signal and feed the analog signal to the speaker 140. The D/A converter 610 may transfer the converted audio signal to the speaker 140, and the speaker 140 may output the audio signal.

Figure 7:
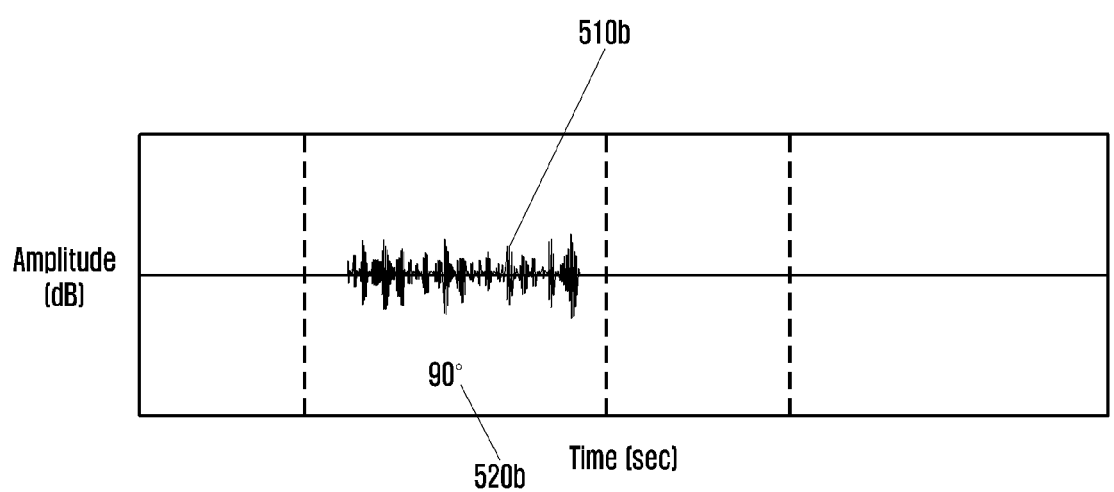
FIG. 7 is a diagram illustrating an example of a rendered audio signal, according to various embodiments of the present disclosure.

FIG. 7 is a diagram illustrating an example of a rendered audio signal, according to various embodiments of the present disclosure.

FIG. 7 shows the reproduced audio signal, and the horizontal axis denotes the time in which the unit may be a second. In addition, the vertical axis denotes the magnitude of the audio signal in which the unit may be a decibel (dB). When the user wishes to listen to only the audio signal at an angle of 90° (520b), the audio signal 510b corresponding to the angle of 90° among all of the audio signals is reproduced. That is, the audio signals corresponding to the angles rather than 90° may not be reproduced. If the controller 110 recognizes the user's selection for the audio signal of 180°, the controller 110 may reproduce only the audio signal corresponding to the angle of 180° among all of the files.

Figure 8:
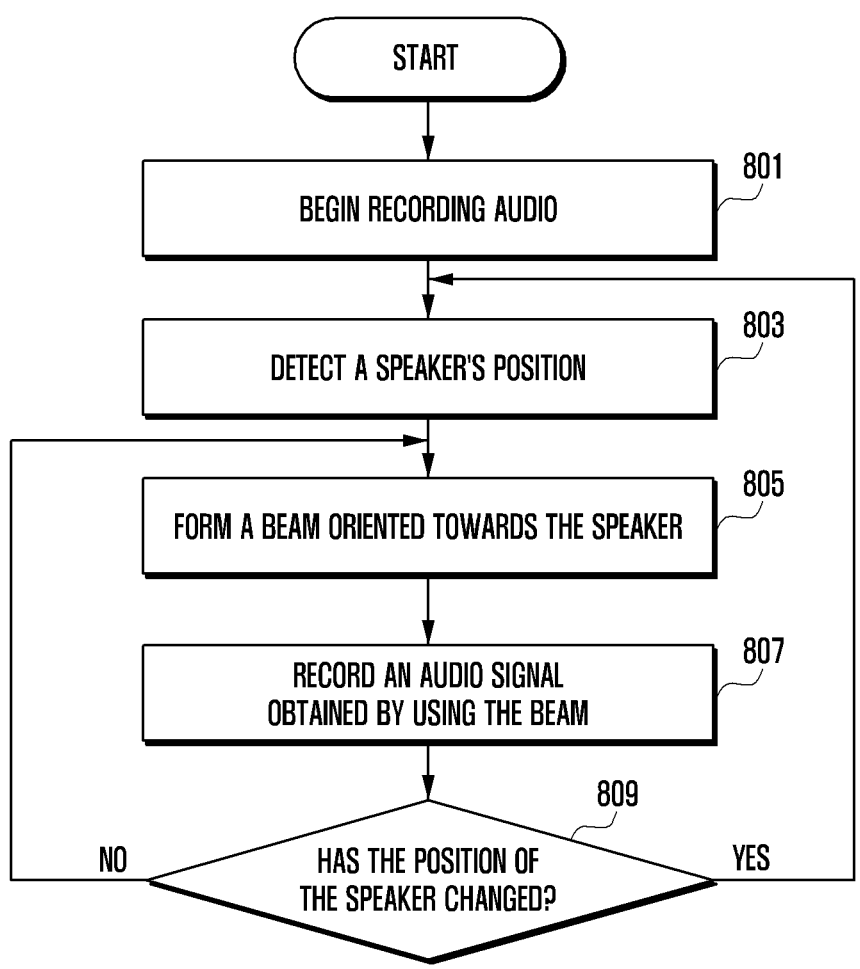
FIG. 8 is a flowchart of an example of a process, according to various embodiments of the present disclosure.
Figure 9:
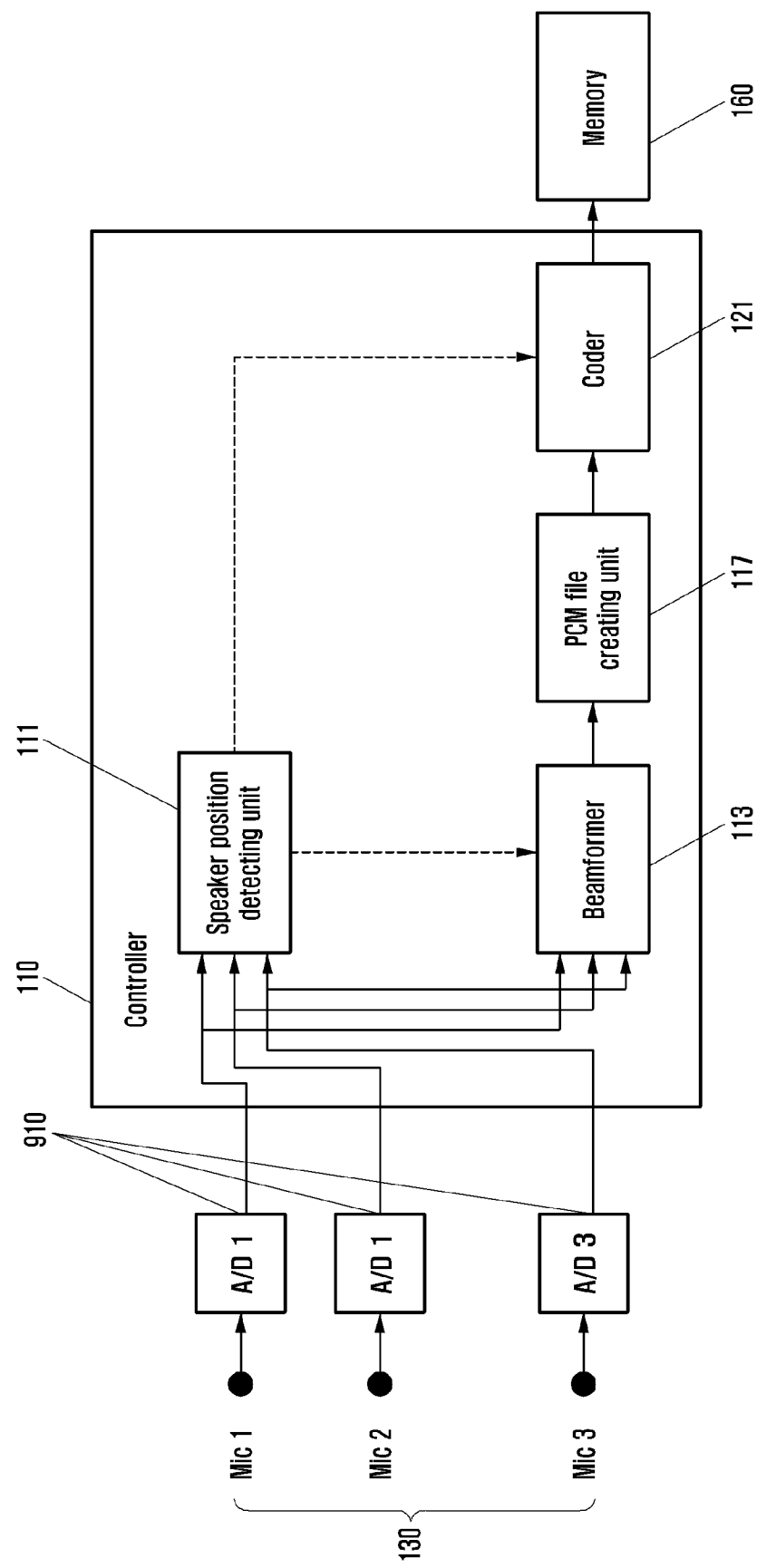
FIG. 9 is a diagram of an example of a system implementing the process of FIG. 8, according to various embodiments of the present disclosure.

FIG. 8 is a flowchart of an example of a process, according to various embodiments of the present disclosure. FIG. 9 is a diagram of an example of a system implementing the process of FIG. 8, according to various embodiments of the present disclosure.

The operation of FIG. 8 will be described in association with the signal flow of FIG. 9. In operation 801, the controller 110 may perform the audio recording. The controller 110 may recognize a user's request to begin the audio recording. As shown in FIG. 9, three microphones may be used by the controller 110 to receive audio signals. Three A/D converters 910 may convert the audio signals received from the plurality of microphones into digital files. The three A/D converters 910 may transfer the audio signals, which have been converted into the digital files, to the controller 110.

In operation 803, the controller 110 may detect the position of the speaker. For example, the controller 110 may recognize the angle corresponding to a received audio signal. As shown in FIG. 9, the audio signals received by the microphone are converted into the digital signals through the A/D converters 910 to be then transferred to the speaker position detecting unit 111. The speaker position detecting unit 111 may recognize the angles corresponding to the received audio signals, and may transfer information corresponding to the angles to the beamformer 113.

In operation 805, the beamformer 113 of the controller 110 may form a beam at the detected angle of the speaker. In instances in which several audio signals are received at different angles through the microphones, the beamformer 113 may form a beam at an angle of the audio signal that has the highest energy level. In operation 807, the controller 110 may store the audio signal recorded by forming the beam, and angle information and time information corresponding thereto.

In operation 809, the controller 110 may determine whether or not the position of the speaker has changed. The speaker position detecting unit 111 may recognize the angle of a received audio signal to thereby determine that the position of the speaker has changed. If the speaker position detecting unit 111 of the controller 110 determines that the angle of the received audio signal, i.e., the angle of the speaker, is changed, the controller may return to operation 803. If the speaker position detecting unit 111 of the controller 110 determines that the angle of the speaker is not changed, the controller may return to operation 805.

As shown in FIG. 9, the beamformer 113 of the controller 110 may transfer the audio signal, which is obtained by implementing the beam, to the PCM file creating unit 117. The PCM file creating unit 117 of the controller 110 may create the audio signal received from the beamformer 113 as a PCM file to transfer the same to the coder 121. In operation 809, the coder 121 may compress the PCM file and the angle information received from the speaker position detecting unit 111 to create an audio file. In addition, the coder 121 of the controller 110 may compress the time information of the received audio signal in the audio file as well. The coder 121 may store the compressed audio file in the memory 160.

Figure 10:
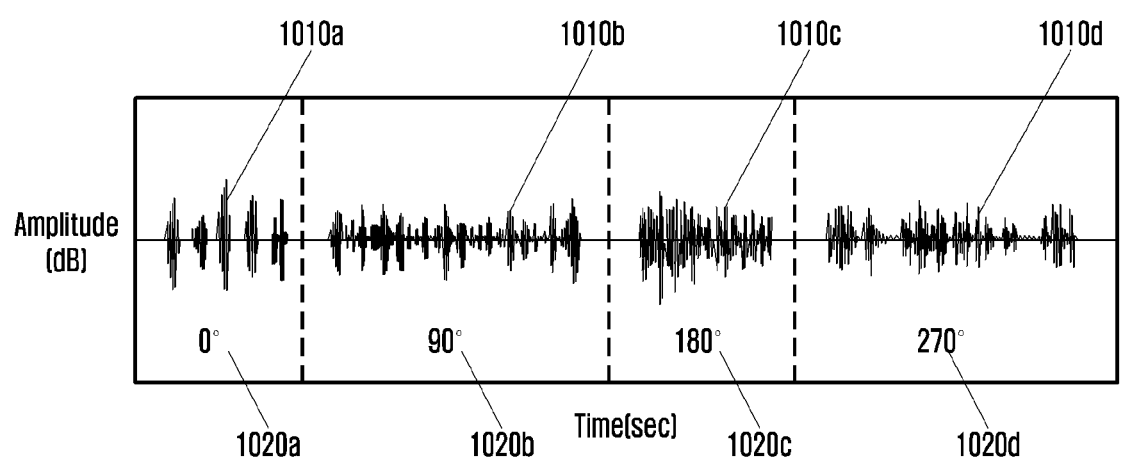
FIG. 10 is a diagram of an example of a stored audio signal according to various embodiments of the present disclosure.

FIG. 10 is a diagram of an example of a stored audio signal, according to various embodiments of the present disclosure. FIG. 10 shows the file recorded through the operation of FIG. 8, and the horizontal axis thereof denotes the time in which the unit may be a second. In addition, the vertical axis thereof denotes the magnitude of the audio signal in which the unit may be a decibel (dB). FIG. 5 shows an example in which that the audio signals corresponding to several angles are stored as a single file. In this example, the audio signals, which are received through the beamforming, and the angles, at which the audio signals are received, are stored together. In addition, the recording time of each audio signal may be stored, in the file as well. The recording time may be expressed as the length of the section for the audio signal of each speaker in the file.

Referring to the recorded file, the audio signal A (1010a) occurs at an angle of 0° (1020a). The audio signal B (1010b) occurs at an angle of 90° (1020b). The audio signal C (1010c) occurs at an angle of 180° (1020c). The audio signal D (1010d) occurs at an angle of 270° (1020d). Comparing the section of the audio signal A (1010a) with the section of the audio signal B (1010b), the section of the audio signal A (1010a) is shorter than the section of the audio signal B (1010b). This means that the recording time for the audio signal A (1010a) is shorter than the recording time of the audio signal B (1010b).

Figure 11:
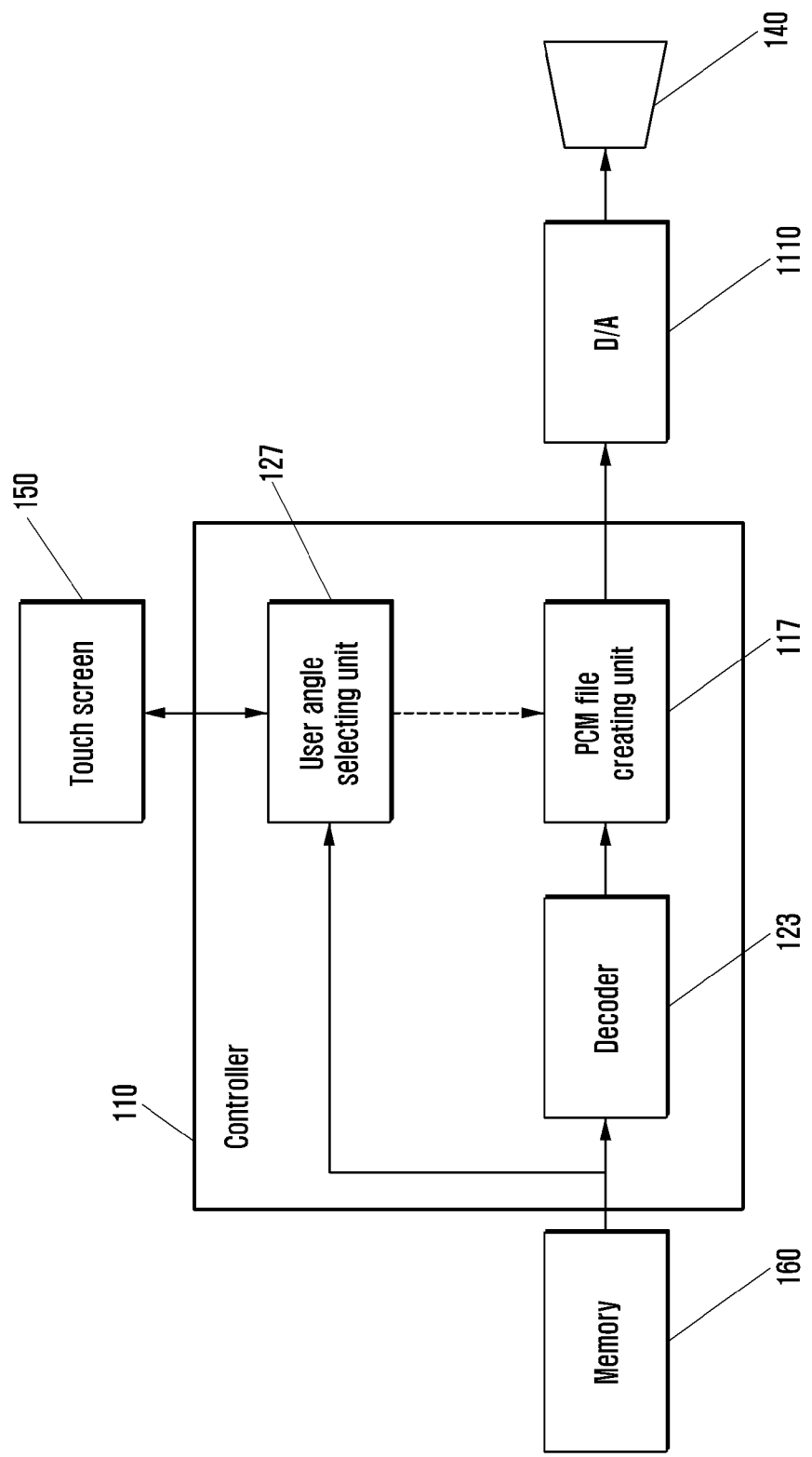
FIG. 11 is a diagram of a system for rendering recorded audio signals, according to various embodiments of the present disclosure.

FIG. 11 is a diagram of a system for rendering recorded audio signals, according to various embodiments of the present disclosure.

Referring to FIG. 11, the user angle selecting unit 127 of the controller 110 may receive angle information corresponding to each audio signal from the memory 160. The decoder 123 of the controller 110 may receive the compressed audio file from the memory 160, and may decompress the same. The PCM file creating unit 117 of the controller 110 may receive the audio signal from the decoder 123, and may transform the same into a PCM file. The audio signal transformed by the PCM file creating unit 117 may be transferred to the D/A converter 1110 so that the angle information is received from the user angle selecting unit 127 and only the audio signal corresponding to the angle is to be reproduced.

The D/A converter 1110 may convert the PCM file of a digital signal into an analog signal and feed the analog signal to the speaker 140. The D/A converter 1110 may transfer the converted audio signal to the speaker 140, and the speaker 140 may output the audio signal.

Figure 12:
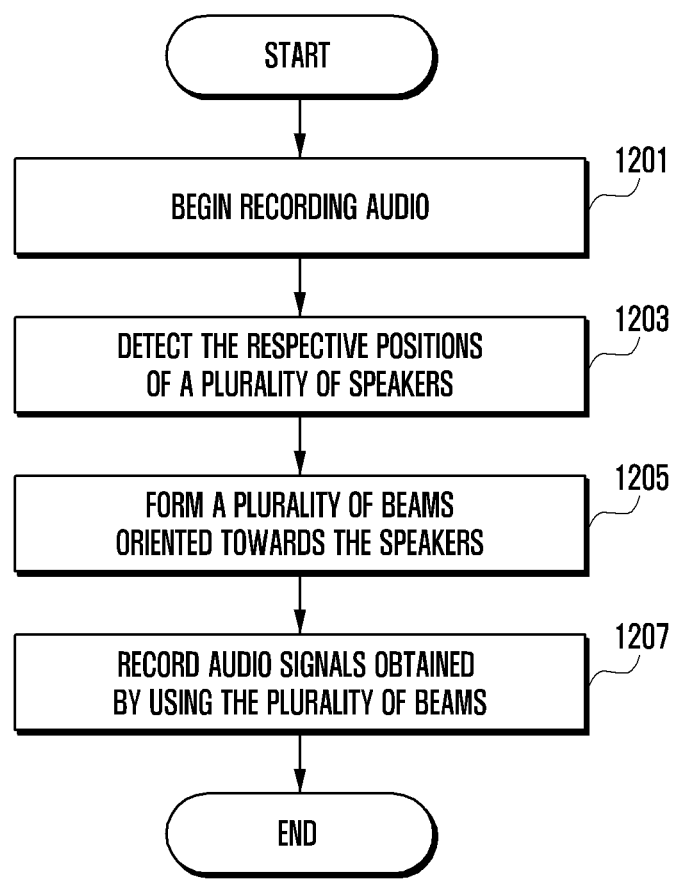
FIG. 12 is a flowchart of an example of a process, according to various embodiments of the present disclosure.
Figure 13:
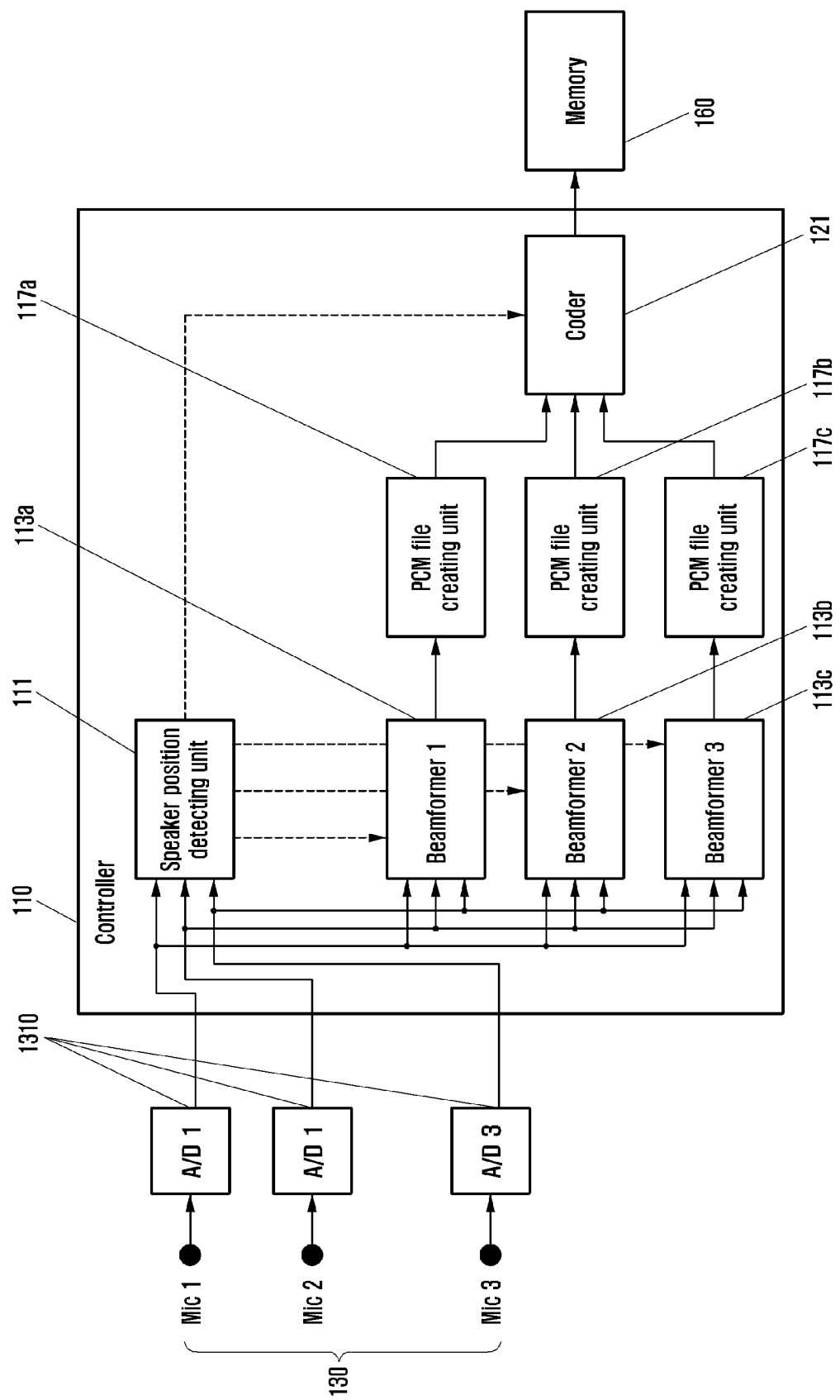
FIG. 13 is a diagram of an example of a system implementing the process of FIG. 12, according to various embodiments of the present disclosure.

FIG. 12 is a flowchart of an example of a process, according to various embodiments of the present disclosure. FIG. 13 is a diagram of an example of a system for implementing the process of FIG. 12, according to various embodiments of the present disclosure.

The operation of FIG. 12 will be described in association with the signal flow of FIG. 13. In operation 1201, the controller 110 may begin recording audio. For example, the controller 110 may recognize a user's request to begin the audio recording. As shown in FIG. 13, three microphones are used by the controller 110 to receive the audio signals. A plurality of A/D converters 1310 may convert the audio signals received from three microphones into digital files. Three A/D converters 1310 may transfer the audio signals, which have been converted into the digital files, to the controller 110.

In operation 1203, the controller 110 may detect the positions of a plurality of speakers. That is, when a plurality of audio signals is received, the controller 110 may recognize the angles corresponding to the audio signals. As shown in FIG. 13, the audio signals received by the three microphones are converted into digital signals by the A/D converter 1310 to be then transferred to the speaker position detecting unit 111. The speaker position detecting unit 111 may recognize the angles corresponding to the received audio signals, and may transfer an indication of each angle to the beamformers 113a to 113c.

In operation 1205, the beamformers 113a to 113c of the controller 110 may form beams at each all of the detected angles, respectively. In addition, the beamformers 113a to 113c of the controller 110 may form the beams only at angles of the audio signals that have greater energies than a predetermined value. As shown in FIG. 13, the beamformers 113a to 113c of the controller 110 may transfer the audio signals, which are obtained by implementing the beams, to the PCM file creating units 117a to 117c. The PCM file creating units 117a to 117c of the controller 110 may transform the audio signals received from the beamformers 113a to 113c into the PCM files to transfer the same to the coder 121. In operation 1207, the coder 121 may create audio files by associating the PCM files with a plurality of pieces of the angle information received from the speaker position detecting unit 111 to thereby compress the same. In addition, the coder 121 of the controller 110 may compress the time information of the received audio signals in the audio file as well. The coder 121 may store the compressed audio files in the memory 160.

Figure 14:
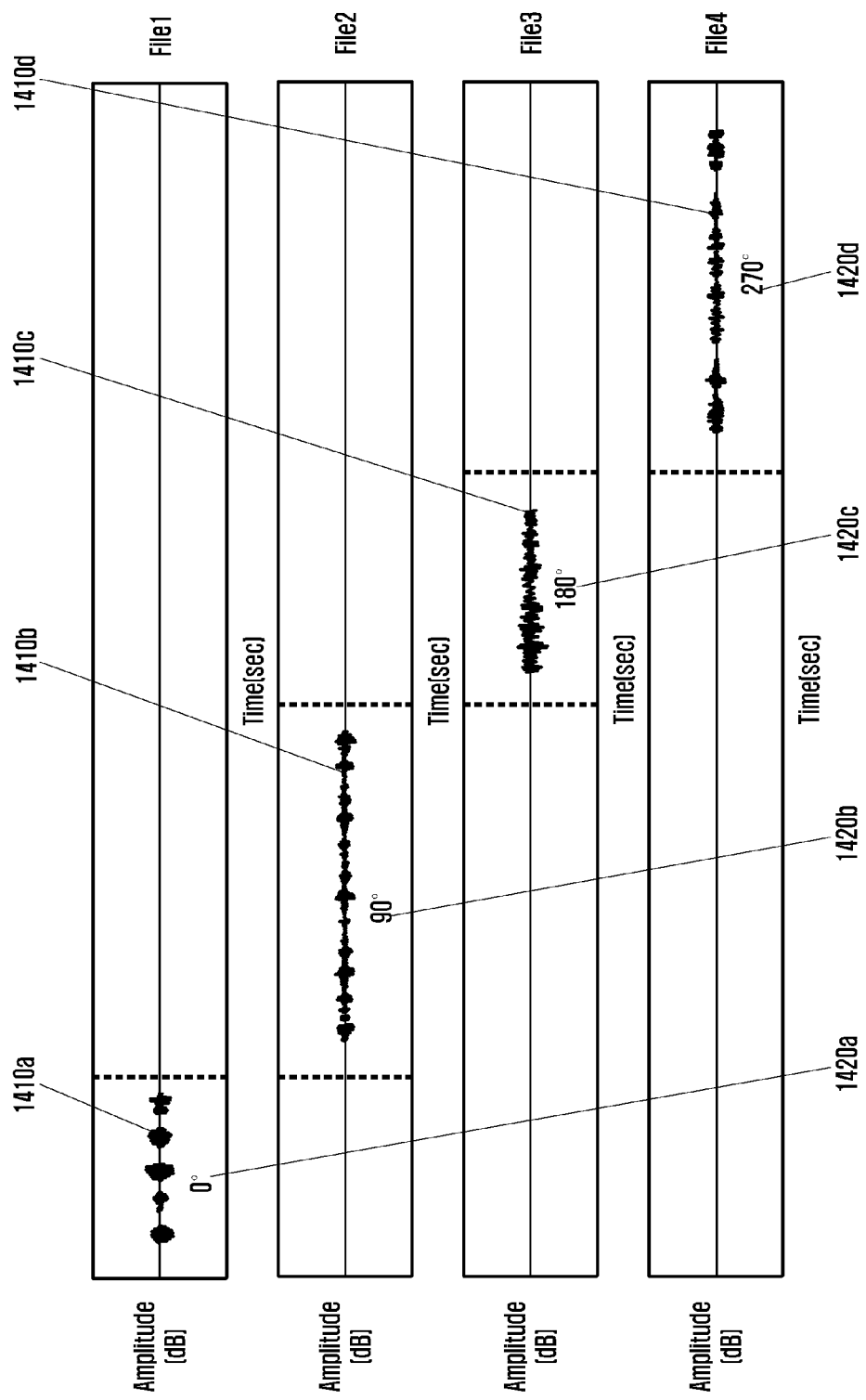
FIG. 14 is a diagram of a stored audio signal, according to various embodiments of the present disclosure.

FIG. 14 is a diagram of a stored audio signal, according to various embodiments of the present disclosure.

FIG. 14 shows the file recorded through the operation of FIG. 12, and the horizontal axis thereof denotes the time in which the unit may be a second. In addition, the vertical axis thereof denotes the magnitude of the audio signal, in which the unit may be a decibel (dB). FIG. 14 shows an example in which the audio signals corresponding to the angles are stored as respective files. In addition, it is assumed that the audio signals of the files are recorded in an order of time in FIG. 14. In the example FIG. 14, the audio signals received through the beamforming, and the angles, at which the audio signals are received, may be stored together. In addition, it shows that the recording time of each audio signal is stored as well. The recording time may be expressed as the length of the section for the audio signal of each speaker in the file.

Referring to the recorded file, the audio signal A (1410a) stored in File 1 occurs at an angle of 0° (1420a). The audio signal B (1410b) stored in File 2 occurs at an angle of 90° (1420b). The audio signal C (1410c) stored in File 3 occurs at an angle of 180° (1420c). The audio signal D (1410d) stored in File 4 occurs at an angle of 270° (1420d).

In addition, although it is not shown in the drawing, the respective representations of all audio signals may be encapsulated in the same file. For example, when another audio signal occurs at the angle of 0° (1420a), another audio signal 1410a may be stored in File 1. If another audio signal additionally occurs after the audio signal 1410d is stored, the additionally created audio signal may be stored after the audio signal 1410d in File 1. In addition, if another audio signal additionally occurs in the middle of storing the audio signal 1410c, the additionally created audio signal may be stored at the same time as the audio signal 1410c of the speaker C (1401c) in File 1.

Figure 15:
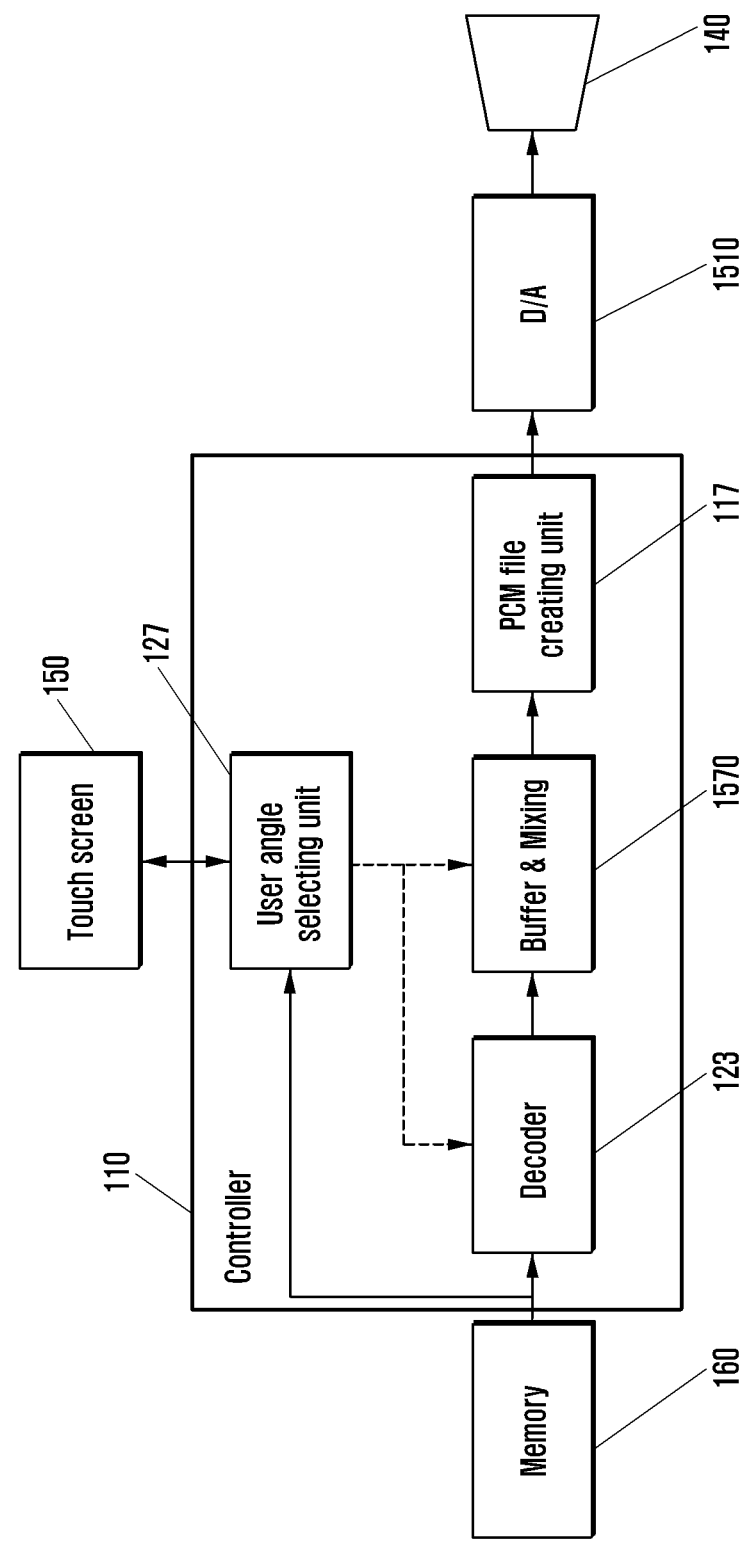
FIG. 15 is a diagram of an example of a system for rendering a stored audio signal, according to various embodiments of the present disclosure.

FIG. 15 is a diagram of an example of a system for rendering a stored audio signal, according to various embodiments of the present disclosure.

Referring to FIG. 15, the user angle selecting unit 127 of the controller 110 may receive the position information, i.e., the angle information corresponding to the speaker from the memory 160. The user angle selecting unit 127 may transfer the received angle information to the touch screen 150, and the touch screen 150 may display the angles corresponding to the received angle information. The user angle selecting unit 127 may recognize the angle selected by the user on the touch screen 150. The user angle selecting unit 127 may transfer the selected angle to the decoder 123, and the decoder 123 may receive only the file corresponding to the selected angle from the memory 160. The decoder 123 may decompress the received file, and may perform the buffer and mixing process 1570 with respect to the file corresponding to the angle selected by the user angle selecting unit 127. The controller 110 may transfer the processed file to the PCM file creating unit 117, and the PCM file creating unit 117 may transform the transferred file to a PCM file. The file created by the PCM file creating unit 117 may be transferred to the D/A converter 1510. The D/A converter 1510 may convert the PCM file of the digital signal into an analog signal and feed the analog signal to the speaker 140. The D/A converter 1510 may transfer the converted audio signal to the speaker 140, and the speaker 140 may output the audio signal.

Figure 16:
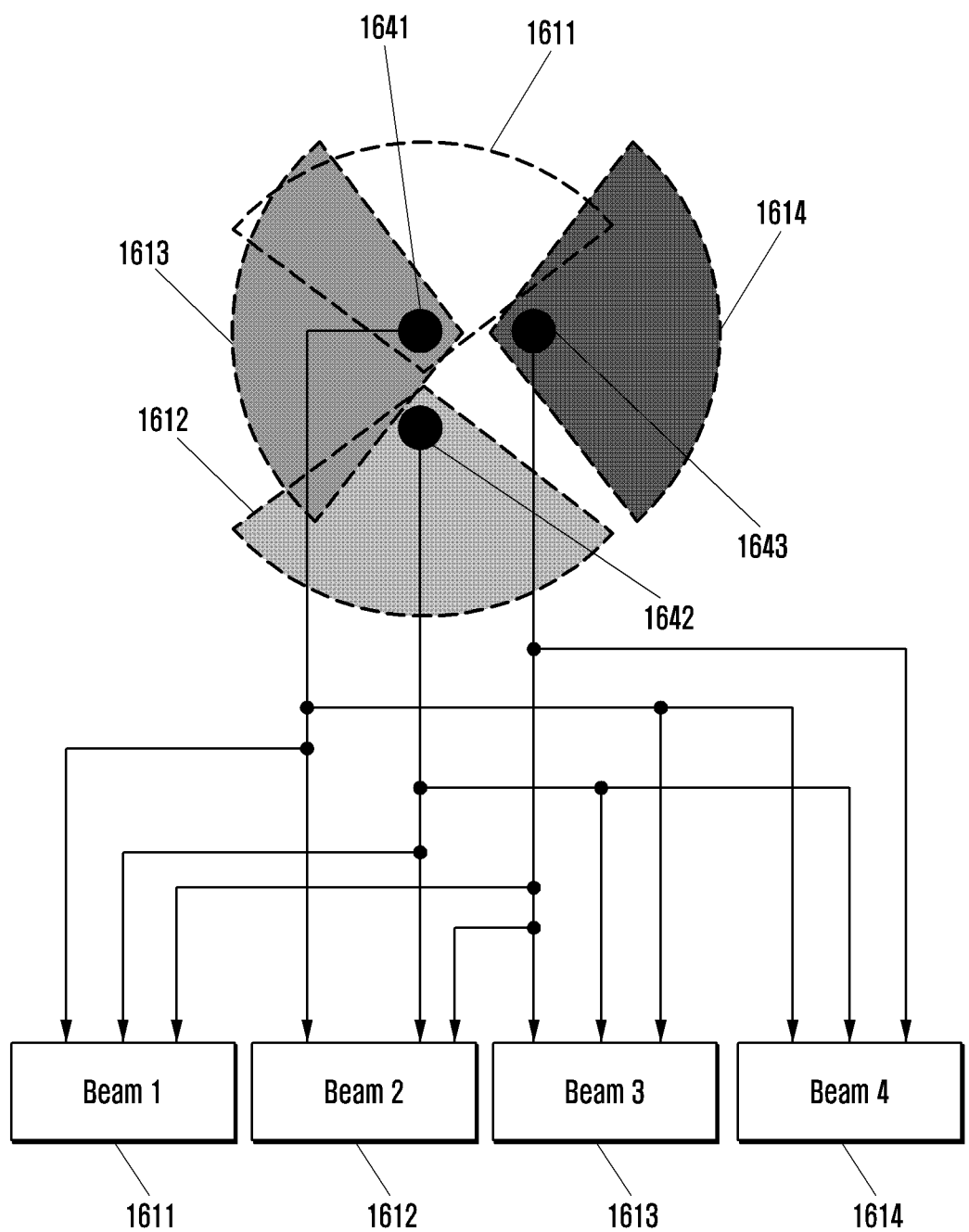
FIG. 16 is a diagram illustrating an example a process for recording audio, according to various embodiments of the present disclosure.

FIG. 16 is a diagram illustrating an example a process for recording audio, according to various embodiments of the present disclosure. Three microphones may be arranged in different directions from each other. One or more beams may be formed through a combination of three microphones.

As shown in the drawing, three microphones 1641, 1642, and 1643 are disposed in different directions from each other, and four beams 1611, 1612, 1613, and 1614 may be formed through a combination of the three microphones 1641, 1642, and 1643. Each of the beams 1611, 1612, 1613, and 1614 may receive the audio signal only at its formed angle. The received audio signals may be stored together with angle information corresponding thereto.

Figure 17:
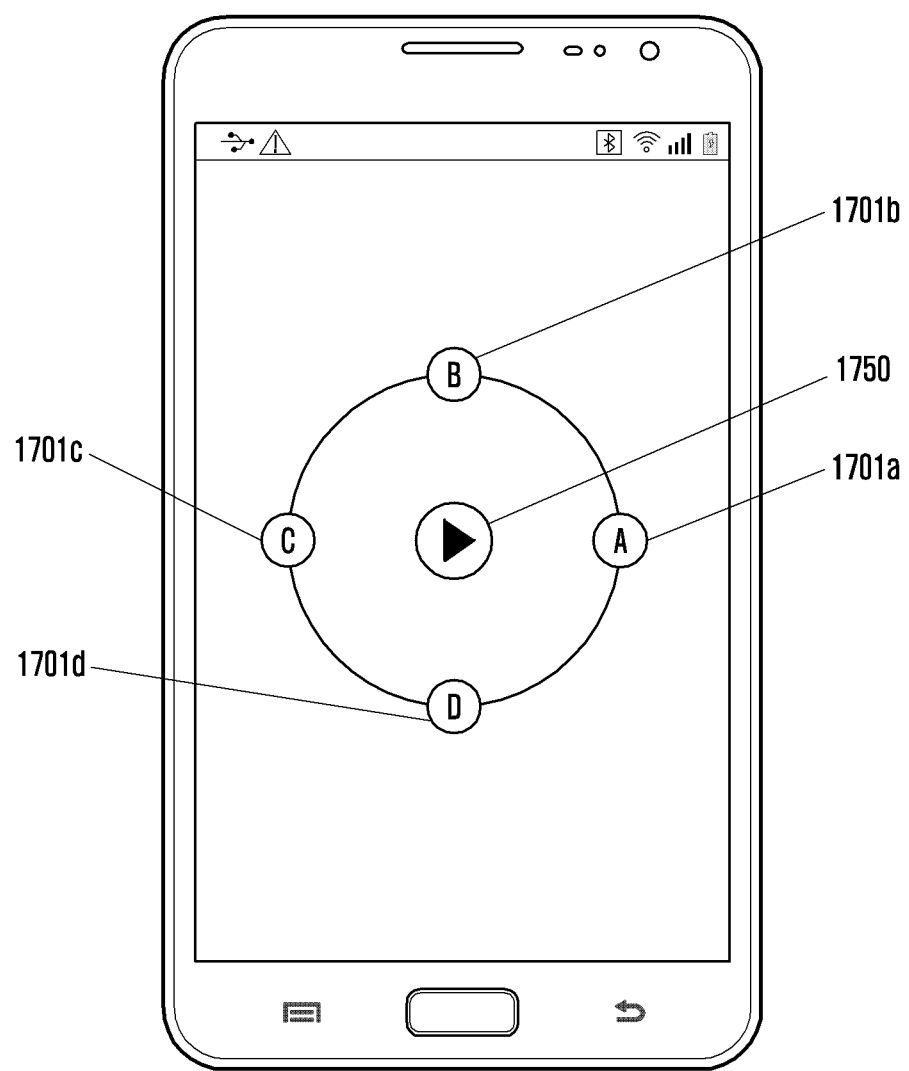
FIG. 17 is a diagram of an example of a user interface for rendering audio, according to various embodiments of the present disclosure.

FIG. 17 is a diagram of an example of a user interface for rendering audio, according to various embodiments of the present disclosure.

Referring to FIG. 17, the controller 110 may display a UI on the touch screen 150, which allows the user to reproduce an audio signal that is associated with a desired direction. In an embodiment, the UI may include identifiers, which indicate the locations of the speakers relative to a microphone array used to record the sound produced by the speakers. The identifiers may be displayed on the circle to correspond to the angles of the speakers. As shown in the drawing, an identifier A (1701a), an identifier B (1701b), an identifier C (1701c), and an identifier D (1701d) are displayed at the positions corresponding to 0°, 90°, 180°, and 270°, which may be approximate locations of the speakers relative to the microphone array.

If the user selects at least one of the identifiers, the controller 110 may reproduce the audio file associated with the angle corresponding to the identifier. In addition, if the user selects the all-play button 1750, the controller 110 may reproduce all of the audio files through the speaker. All of the audio files may be the files that include the audio signals at all angles.

Figure 18:
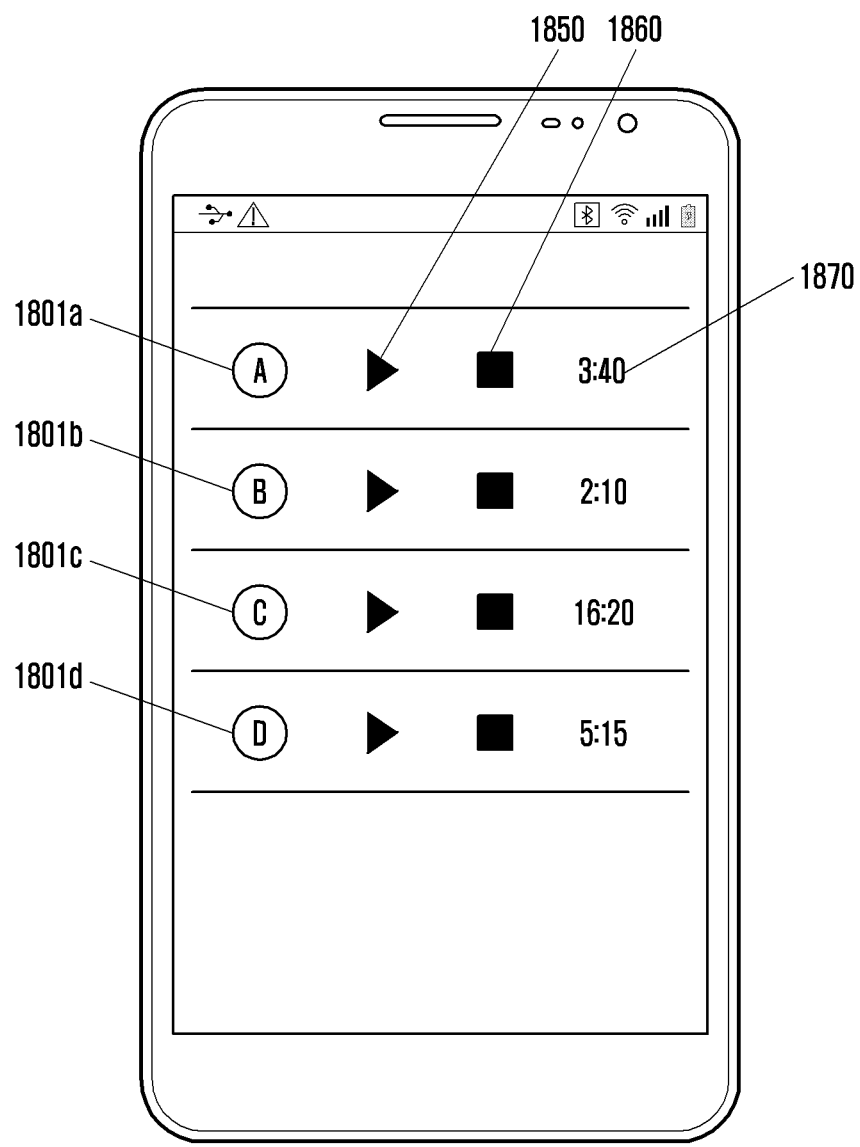
FIG. 18 is a diagram of an example of a user interface for rendering audio, according to various embodiments of the present disclosure.

FIG. 18 is a diagram of an example of a user interface for rendering audio, according to various embodiments of the present disclosure.

Referring to FIG. 18, the controller 110 may display a list that allows the user to select an audio signal that is associated with a desired direction. The list may include an identifier that indicates the speaker, a play button 1850, a stop button 1860, and a recording time 1870. If the user selects one of the identifiers 1801a to 1801d, the controller 110 may reproduce the stored audio file corresponding to the selected identifier through the speaker 140. For example, when the user selects the play button 1850 in order to listen to the audio signal of the identifier A (1801a), the controller 110 may reproduce the stored audio file associated with the identifier 1801a for 3 min 40 sec.

In addition, when one of the identifiers is selected by the user, the controller 110 may provide section information corresponding to the selected identifier. The section information may be the information indicating the start time and the end time of the recorded audio signal of the speaker corresponding to the selected identifier among the entire recording time. The controller 110 may express the section information as images or numbers.

For example, when the user selects the identifier A (1801*a*), the controller 110 may provide the section information corresponding to the selected identifier A (1801*a*). The section information of the identifier A (1801*a*) may be the information stating that the audio signal is recorded from the time of 3 min to the time of 6 min 40 sec of the whole recording time of 27 min 35 sec. The controller 110 may provide the section information when the user selects the identifier A (1801*a*), or may display the section information in the list or in the reproduced image when the recording time is selected or while the audio file is reproduced.

Figure 19:
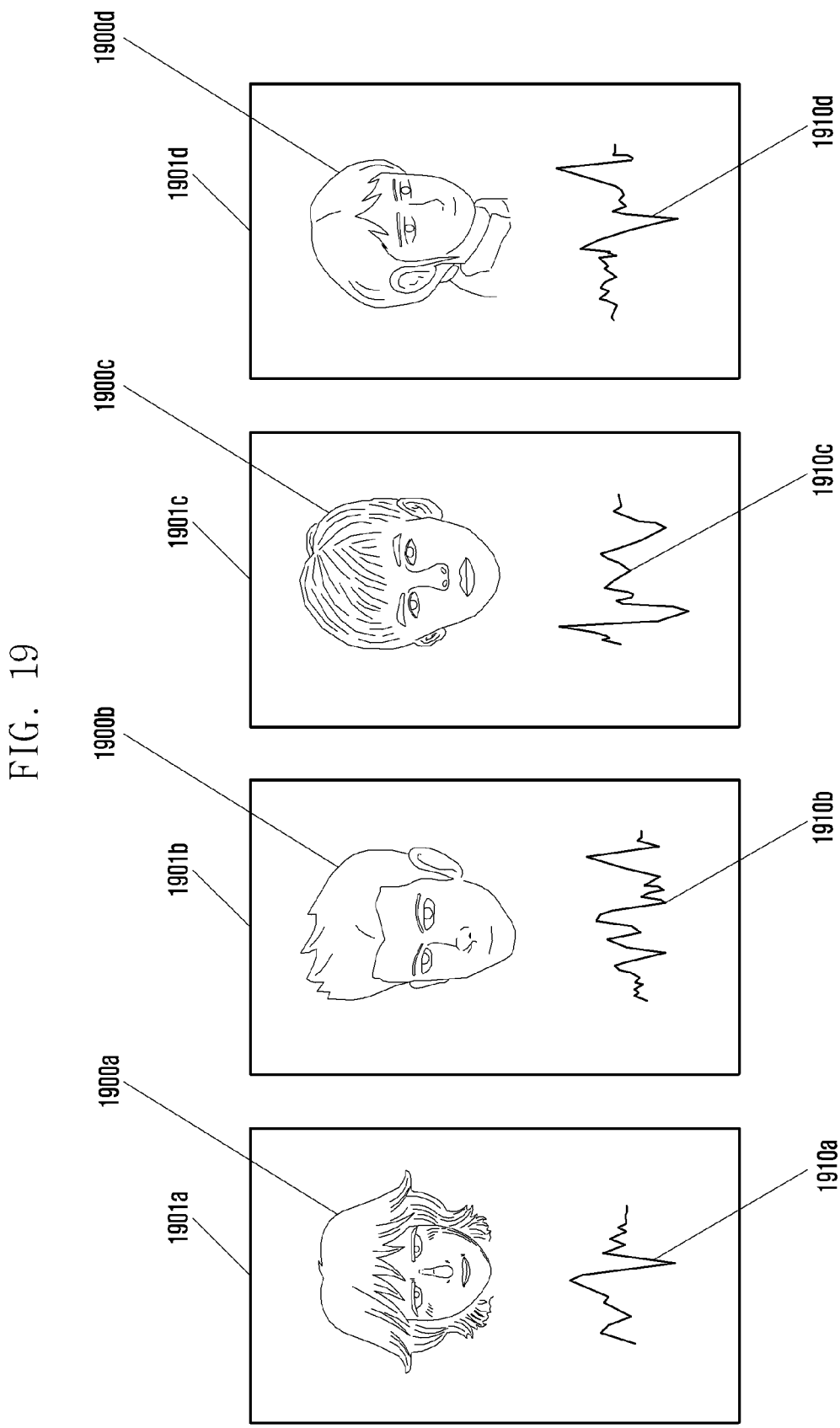
FIG. 19 is a diagram of an example of a user interface for rendering audio, according to various embodiments of the present disclosure.

FIG. 19 is a diagram of an example of a user interface for rendering audio, according to various embodiments of the present disclosure.

The controller 110 may identify the speakers of the recorded audio signals as well as the audio signals according to the angles. To this end, the controller 110 may pre-store speaker recognition information using a sound-shot function before performing the audio recording. The speaker recognition information may include the waves of the audio signals and photos of the speakers. The sound-shot function refers to the function of storing the audio signal recorded when taking a photo, together with the photo.

For example, if the user photographs the face of the speaker A (1900*a*) and records the audio signal 1910*a* of the speaker using the sound-shot function, the controller 110 may map the photo with the audio signal to thereby store the same as a single audio file 1901*a* in the memory 160. As shown in FIG. 19, the photos of the speaker A (1900*a*), the speaker B (1900*b*), the speaker C (1900*c*), and the speaker D (1900*d*) may be stored together with the audio signal wave 1910*a* of the speaker A (1900*a*), the audio signal wave 1910*b* of the speaker B (1900*b*), the audio signal wave 1910*c* of the speaker C (1900*c*), and the audio signal wave 1910*d* of the speaker D (1900*d*) as files 1901*a* to 1901*d*, respectively. The audio signal waves may be distinct from each other depending on the features of the human voice, so the audio signal wave may be used to identify the speakers.

In another embodiment, in order to recognize the speakers, the user may pre-store the voices of the speakers as the speaker recognition information before the recording of the audio signals. According to this, the controller 110 may record the voices of the speakers to be stored in the memory 160, and may use the same for the comparison later. Additionally or alternatively, when storing the voices of the speakers, the user may also store the names of the speakers, and/or other information that can be used to indicate the speakers' identities.

In another embodiment, during a phone call with those who are stored in the contact information, the controller 110 may store the voices of the speakers in the memory 160 to use the same as the speaker recognition information.

Figure 20:
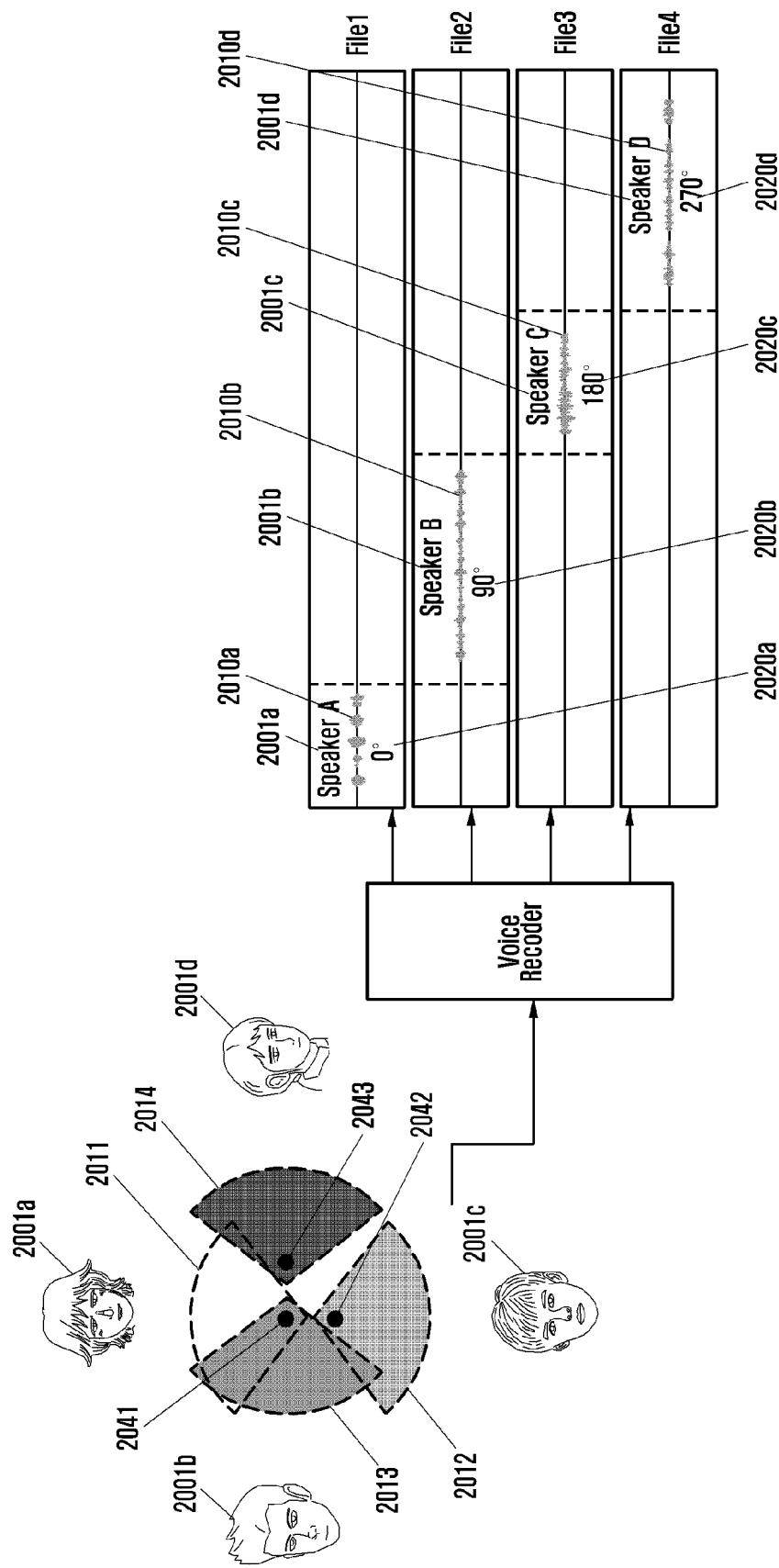
FIG. 20 is a diagram illustrating an example of a process for recording audio, according to various embodiments of the present disclosure.

FIG. 20 is a diagram of an example of a process for recording audio, according to various embodiments of the present disclosure.

As mentioned in FIG. 19, the controller 110 may take photos of the speakers, and may pre-store the photos and the audio signals in the memory 160 using the sound-shot function, in order to identify the speaker of the recorded audio signal according to the angles. Referring to FIG. 20, the controller 110 may compare the waves of the audio signals stored at the angles with the audio signal waves of the sound-shot files stored in the memory 160. If the controller 110 finds the sound-shot file that has an audio signal wave that matches the wave of the stored audio signal at each angle, the controller 110 may map the photo of the sound-shot file with the audio signal stored at each angle to thereby store the same. For example, as shown in FIG. 20, the speaker A (2001*a*), the speaker B (2001*b*), the speaker C (2001*c*), and the speaker D (2001*d*) may form the beams 2011 to 2014 to receive the audio signals of the speakers, respectively. The memory 160 may have the photos and the audio signals of the speakers 2001*a* to 2001*d*. The controller 110 may compare the received audio signal waves of the speakers with the audio signal waves stored in the memory 160 to thereby map the same to match each other to be then stored.

In another embodiment, the controller 110 may compare the received audio signal waves of the speakers with the audio signal waves that have been pre-recorded and pre-stored for the comparison. The controller 110 may compare the received audio signal waves of the speakers with the audio signal waves stored in the memory 160 to determine the respective identities of the speakers.

In another embodiment, the controller 110 may compare the received audio signal waves of the speakers with the audio signal waves of the users who are represented in the contact information. The controller 110 may compare the received audio signal waves of the speakers with the audio signal waves stored in the memory 160 to determine the identities of the speakers.

Referring to the files recorded according to the various embodiments above, the audio signal A (2010*a*) stored in File 1 occurs at an angle of 0° (2020*a*) by the speaker A (2001*a*). The audio signal B (2010*b*) stored in File 2 occurs at an angle of 90° (2020*b*) by the speaker B (2001*b*). The audio signal C (2010*c*) stored in File 3 occurs at an angle of 180° (2020*c*) by the speaker C (2001*c*). The audio signal D (2010*d*) stored in File 4 occurs at an angle of 270° (2020*d*) by the speaker D (2001*d*).

FIG. 21 is a diagram of an example of a user interface for rendering audio, according to various embodiments of the present disclosure.

As mentioned in FIG. 20, the audio files may be stored according to the speaker through the speaker recognition. The controller 110 may create documents with respect to the files stored according to the speakers, using a speech-to-text (STT) function.

As shown in FIG. 21, the controller 110 may create the minutes 2100 as one of the documents. The minutes 2100 may include identifiers 2101 or photos of the speakers for identifying the speakers, STT-transformed text 2103, the recording time of the audio file 2105, and play buttons 2107 for reproducing the audio file. For example, the controller 110 may transform the audio file of the speaker A (2101*a*), which is recorded first, into the text, and may record the same in the minutes 2100 ordered by time. The controller 110 may include the play button 2107 for reproducing the audio file corresponding to the recording time 2105 of "00:00:00~00:00:34" in the minutes 2100.

FIGS. 1-21 are provided as an example only. At least some of the steps discussed with respect to these figures can be performed concurrently, performed in a different order, and/or altogether omitted. It will be understood that the provision of the examples described herein, as well as clauses phrased as "such as," "e.g.", "including", "in some aspects," "in some implementations," and the like should not be interpreted as limiting the claimed subject matter to the specific examples.

The above-described aspects of the present disclosure can be implemented in hardware, firmware or via the execution of software or computer code that can be stored in a recording medium such as a CD-ROM, a Digital Versatile Disc (DVD), a magnetic tape, a RAM, a floppy disk, a hard disk, or a magneto-optical disk or computer code downloaded over a network originally stored on a remote recording medium or a non-transitory machine-readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

While the present disclosure has been particularly shown and described with reference to the examples provided therein, it will be understood by those skilled in the art that various changes in form and details may be made therein without departing from the spirit and scope of the present disclosure as defined by the appended claims.

What is claimed is:

1. A mobile phone comprising:
   a display;
   a speaker;
   a plurality of microphones;
   a memory to store audio data including at least a first acoustic signal corresponding to a first user and a second acoustic signal corresponding to a second user, the audio data including first angle information corresponding to a first direction of the first user with respect to the mobile phone, and second angle information corresponding to a second direction of the second user with respect to the mobile phone; and
   a processor configured to:
   detect the first acoustic signal and the second acoustic signal by using at least one of the plurality of microphones; and
   detect the first angle information associated with the first acoustic signal, and the second angle information associated with the second acoustic signal; and
   form a first beam having a first angle and a second beam having a second angle by using at least one of the plurality of microphones, wherein the first beam is used to determine the first angle information and the second beam is used to determine the second angle information; wherein the first and second beams are configured to reduce noise from the first and second acoustic signal upon applying a weight value to the at least one of the plurality of microphones; and
   reproduce the audio data using an application;
   present, via the display, a first indication at a first position of the display corresponding to the first direction of the first user with respect to the mobile phone, and a second indication at a second position corresponding to the second direction of the second user with respect to the mobile phone based at least in part on the reproducing of the audio data;
   receive a selection of one of the first indication and the second indication;
   output, via the speaker, the first acoustic signal when the first indication is selected; and
   output, via the speaker, the second acoustic signal when the second indication is selected.

2. The mobile phone of claim 1, wherein the processor is configured to:
   display a circular graphic representation in relation with the reproducing, the circular graphic representation including a plurality of sub portions, each of the plurality of sub portions indicating a different angle corresponding to a different direction.

3. The mobile phone of claim 2, wherein the processor is configured to:
   display, as at least part of the presenting, the first indication at a first sub area selected from a plurality of sub areas, and the second indication at a second sub area selected from the plurality of sub areas, the first sub area corresponding to the first position and the second sub area corresponding to the second position.

4. The mobile phone of claim 3, wherein the processor is configured to:
   display a graphic representation to control the audio data in a proximate center of the circular graphic representation.

5. The mobile phone of claim 4, wherein the processor is configured to:
   output, via the speaker, the first acoustic signal and the second acoustic signal concurrently in response to another input with respect to the graphic representation.

6. A mobile phone comprising:
   a display;
   a plurality of microphones;
   a memory to store audio data including a first acoustic signal from a first user at a first direction with respect to the mobile phone and first angle information corresponding to the first direction of the first user with respect to the mobile phone and a second acoustic signal from a second user at a second direction with respect to the mobile phone and second angle information corresponding to the second direction of the second user with respect to the mobile phone; and
   a processor configured to:
   detect the first acoustic signal and the second acoustic signal by using at least one of the plurality of microphones; and
   detect the first angle information associated with the first acoustic signal, and the second angle information associated with the second acoustic signal; and
   form a first beam having a first angle and a second beam having a second angle by using at least one of the plurality of microphones, wherein the first beam is used to determine the first angle information and the second beam is used to determine the second angle information; wherein the first and second beams are configured to reduce noise from the first and second acoustic signal upon applying a weight value to the at least one of the plurality of microphones; and
   reproduce the audio data; and
   display a circular graphic user interface in relation with the reproducing, present, a first indication at a first position of the circular graphic user interface, the first position associated with the first angle information when the first acoustic signal is being reproduced, and a second indication at a second position of the circular graphic user interface, the second position associated with the second angle information when the second acoustic signal is being reproduced.

7. The mobile phone of claim 6, wherein the processor is configured to: output, as at least part of the reproducing, the first acoustic signal or the second acoustic signal via a speaker operatively coupled with the mobile phone.

8. The mobile phone of claim 6, wherein the processor is configured to: receive an input with respect to the first indication; and output the first acoustic signal via a speaker in response to the input.

9. The mobile phone of claim 8, wherein the processor is configured to: refrain from outputting the second acoustic signal via the speaker in response to the input.

10. The mobile phone of claim 6, wherein the processor is configured to: generate, using a speech-to-text function, a first text data corresponding to the first acoustic signal and a second text data corresponding to the second acoustic signal.

11. The mobile phone of claim 10, wherein the first indication comprises first identification information of a first user corresponding to the first acoustic signal, and the second indication comprises second identification information of a second user corresponding to the second acoustic signal, wherein the processor is adapted to: store, in the memory, the first text data as related to the first identification information, and the second text data as related to the second identification information.

12. The mobile phone of claim 1, wherein the processor is configured to display a plurality of users including the first user and the second user according to a detected angle of a respective audio signal.

13. The mobile phone of claim 12, wherein each of the plurality of users shown on the display are selectable in response to a touch selection in which the audio data of a particular user is output.

14. The mobile phone of claim 12, wherein the processor is configured to map at predetermined intervals received audio data for each of plurality of users.

* * * * *